(12) United States Patent
Shih

(10) Patent No.: US 11,317,373 B2
(45) Date of Patent: Apr. 26, 2022

(54) METHOD AND APPARATUS FOR MOBILE-TERMINATED EARLY DATA TRANSMISSION (MT-EDT) AND PRECONFIGURED UPLINK RESOURCES (PUR) IN A WIRELESS COMMUNICATION SYSTEM

(71) Applicant: ASUSTek Computer Inc., Taipei (TW)

(72) Inventor: Tun-Huai Shih, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 16/861,343

(22) Filed: Apr. 29, 2020

(65) Prior Publication Data
US 2020/0383085 A1 Dec. 3, 2020

Related U.S. Application Data

(60) Provisional application No. 62/856,643, filed on Jun. 3, 2019.

(51) Int. Cl.
H04W 68/00 (2009.01)
H04W 74/08 (2009.01)
(Continued)

(52) U.S. Cl.
CPC ....... *H04W 68/005* (2013.01); *H04W 56/005* (2013.01); *H04W 72/1268* (2013.01); *H04W 72/1289* (2013.01); *H04W 74/0833* (2013.01)

(58) Field of Classification Search
CPC ............. H04W 74/0833; H04W 76/27; H04W 56/0045; H04W 72/0413; H04W 4/70; H04W 56/0015; H04W 68/02; H04W 72/042; H04W 72/0446; H04W 72/1278; H04W 74/002; H04W 76/30;
(Continued)

(56) References Cited

U.S. PATENT DOCUMENTS

2019/0104553 A1* 4/2019 Johansson ................ H04L 1/12
2019/0223221 A1* 7/2019 Johansson ............. H04W 76/27
(Continued)

FOREIGN PATENT DOCUMENTS

CN 110557820 A 12/2019
EP 3648542 A1 * 5/2020 ............ H04W 76/11
(Continued)

OTHER PUBLICATIONS

3GPP TSG-WG2 Meeting #109e E-Meeting, Feb. 24-Mar. 6, 2020 R2-2001868.*
(Continued)

*Primary Examiner* — Joseph Arevalo
(74) *Attorney, Agent, or Firm* — Cooper Legal Group, LLC

(57) ABSTRACT

A method and apparatus are disclosed. In an example from the perspective of a User Equipment (UE), the UE receives, from a network node, a paging message indicative of Mobile-terminated Early Data Transmission (MT-EDT). Responsive to receiving the paging message, the UE determines a validity of a timing parameter associated with one or more Preconfigured Uplink Resources (PUR). The UE determines, based on the validity, whether to initiate a Random Access (RA) procedure for MT-EDT or to initiate a transmission using the one or more PURs.

22 Claims, 18 Drawing Sheets

(51) Int. Cl.
*H04W 56/00* (2009.01)
*H04W 72/12* (2009.01)

(58) Field of Classification Search
CPC ............. H04W 48/10; H04W 52/0216; H04W 52/0229; H04W 56/0005; H04W 56/001; H04W 56/004; H04W 56/005; H04W 68/00; H04W 68/005; H04W 72/048; H04W 72/0493; H04W 72/14; H04W 76/11
USPC ............... 455/458, 437, 450, 509, 522, 423; 370/329, 392, 469
See application file for complete search history.

(56) References Cited

U.S. PATENT DOCUMENTS

2020/0107389 A1* 4/2020 Charbit ............. H04W 72/0446
2020/0205106 A1* 6/2020 Shreevastav ...... H04W 56/0015
2020/0245370 A1* 7/2020 Hoglund ............... H04W 76/10
2020/0322981 A1* 10/2020 Choe ................. H04W 74/0833

FOREIGN PATENT DOCUMENTS

| WO | WO-2019074436 A1 * | 4/2019 | ............ H04W 74/08 |
| WO | 2019193243 A1 | 10/2019 | |
| WO | WO-2019193243 A1 * | 10/2019 | ........ H04W 74/0833 |
| WO | WO-2020093316 A1 * | 5/2020 | ............ H04W 68/02 |

OTHER PUBLICATIONS

Corresponding Korean Patent Application No. 10-2020-0052483, Office Action dated Dec. 8, 2021. English Translation.
ZTE Corporation, Sanechips, "Further Discussion on Msg2-based solution for MT EDT", 3GPP TSG-RAN2 meeting #106 R2-1905756, Revision of R2-1903493, pp. 1-9, May 13-17, 2019, Reno, NV.
LG Electronics Inc., "Discussion of Msg2 based MT EDT solution", 3GPP TSG-RAN WG2 Meeting #105bis, R2-1904774, pp. 1-2, Apr. 8-12, 2019, Xi'an, China.

* cited by examiner

METHOD AND APPARATUS FOR MOBILE-TERMINATED EARLY DATA TRANSMISSION (MT-EDT) AND PRECONFIGURED UPLINK RESOURCES (PUR) IN A WIRELESS COMMUNICATION SYSTEM

CROSS-REFERENCE TO RELATED APPLICATIONS

The present Application claims the benefit of U.S. Provisional Patent Application Ser. No. 62/856,643 filed on Jun. 3, 2019, the entire disclosure of which is incorporated herein in its entirety by reference.

FIELD

This disclosure generally relates to wireless communication networks, and more particularly, to a method and apparatus for Mobile-terminated Early Data Transmission (MT-EDT) and Preconfigured Uplink Resources (PUR) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives, from a network node, a paging message indicative of Mobile-terminated Early Data Transmission (MT-EDT). Responsive to receiving the paging message, the UE determines a validity of a timing parameter associated with one or more Preconfigured Uplink Resources (PUR). The UE determines, based on the validity, whether to initiate a Random Access (RA) procedure for MT-EDT or to initiate a transmission using the one or more PURs.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.300 V15.5.0, "E-UTRA and E-UTRAN, Overall description, Stage 2"; 3GPP TS 36.331 V15.5.0, "E-UTRA, RRC protocol specification"; 3GPP TS 36.304 V15.2.0, "E-UTRA, User Equipment (UE) procedures in idle mode"; 3GPP RAN1 #94 Chairman's Note; 3GPP RAN1 #94bis Chairman's Note; 3GPP RAN1 #95 Chairman's Note; 3GPP RAN1 #96 Chairman's Note; 3GPP RAN1 #96bis Chairman's Note; 3GPP RAN1 #97 Chairman's Note; 3GPP TS 36.211 V15.5.0, "E-UTRA, Physical channels and modulation". The standards and documents listed above are hereby expressly incorporated by reference in their entirety.

Figure 1:
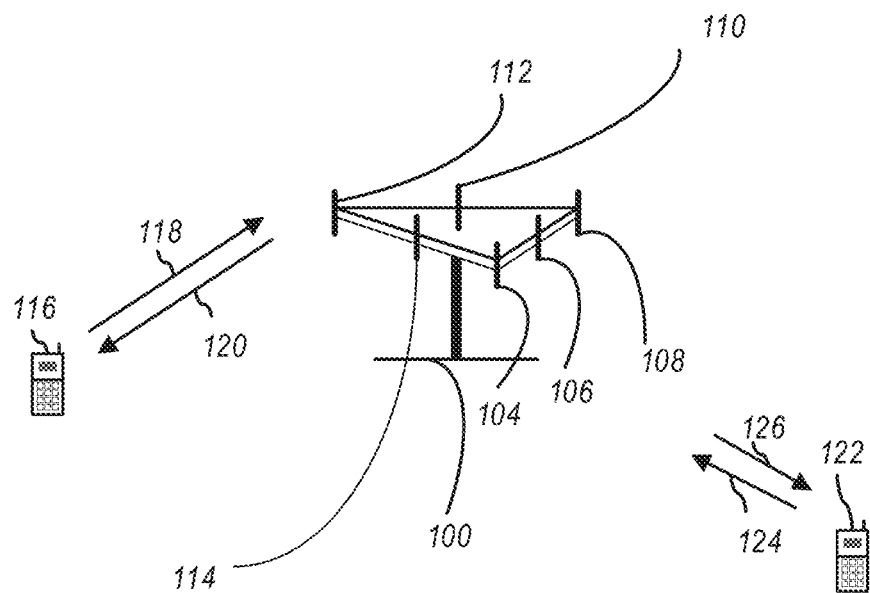
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
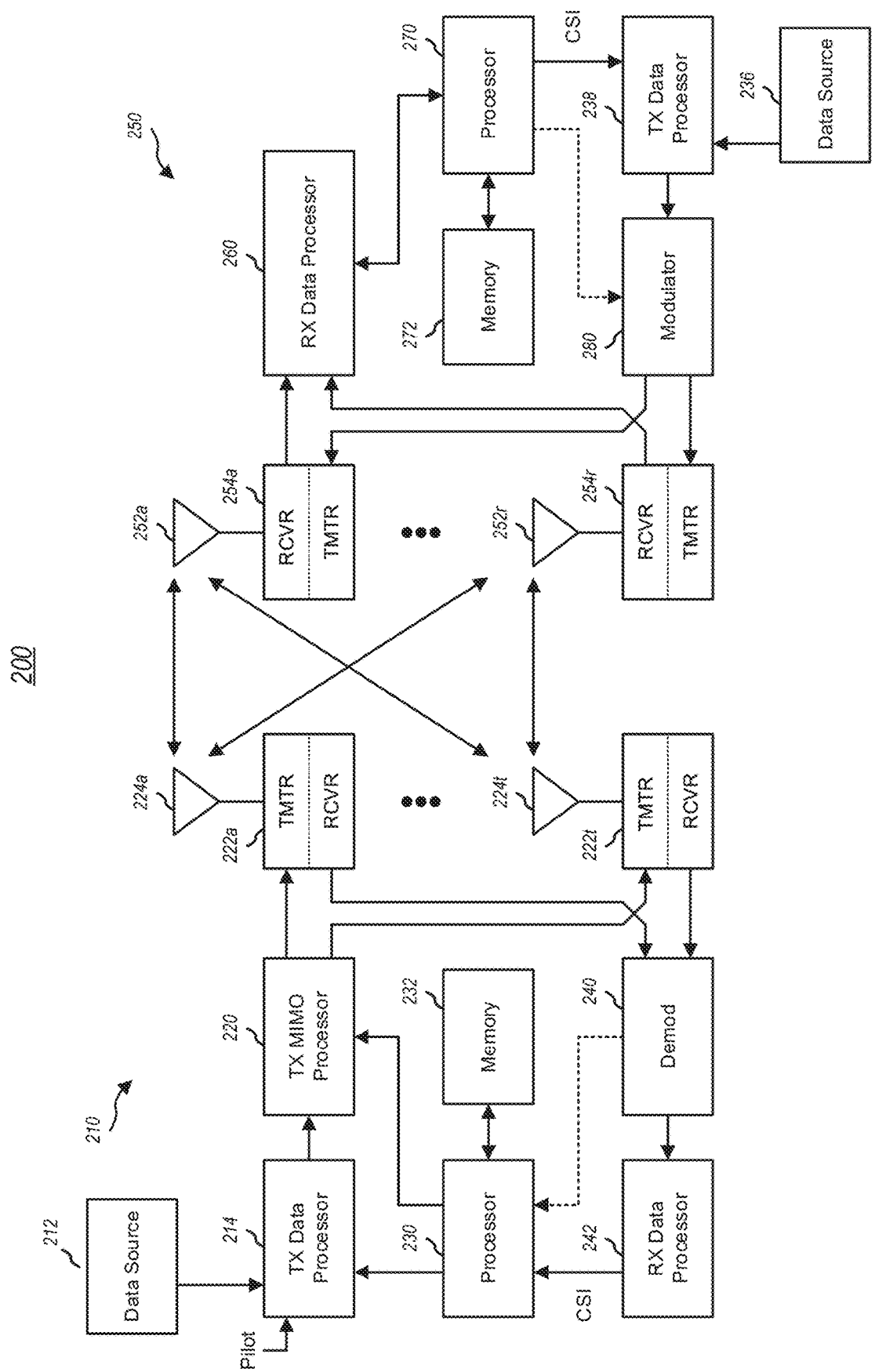
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
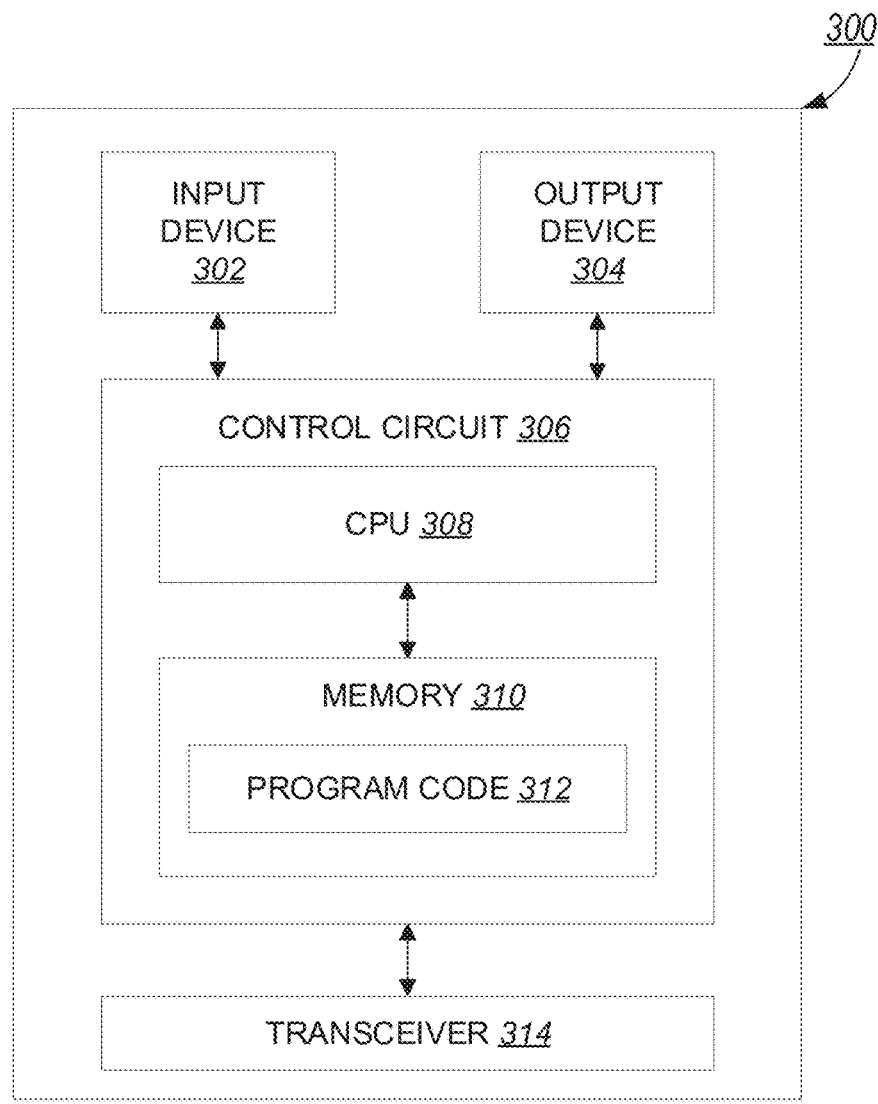
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
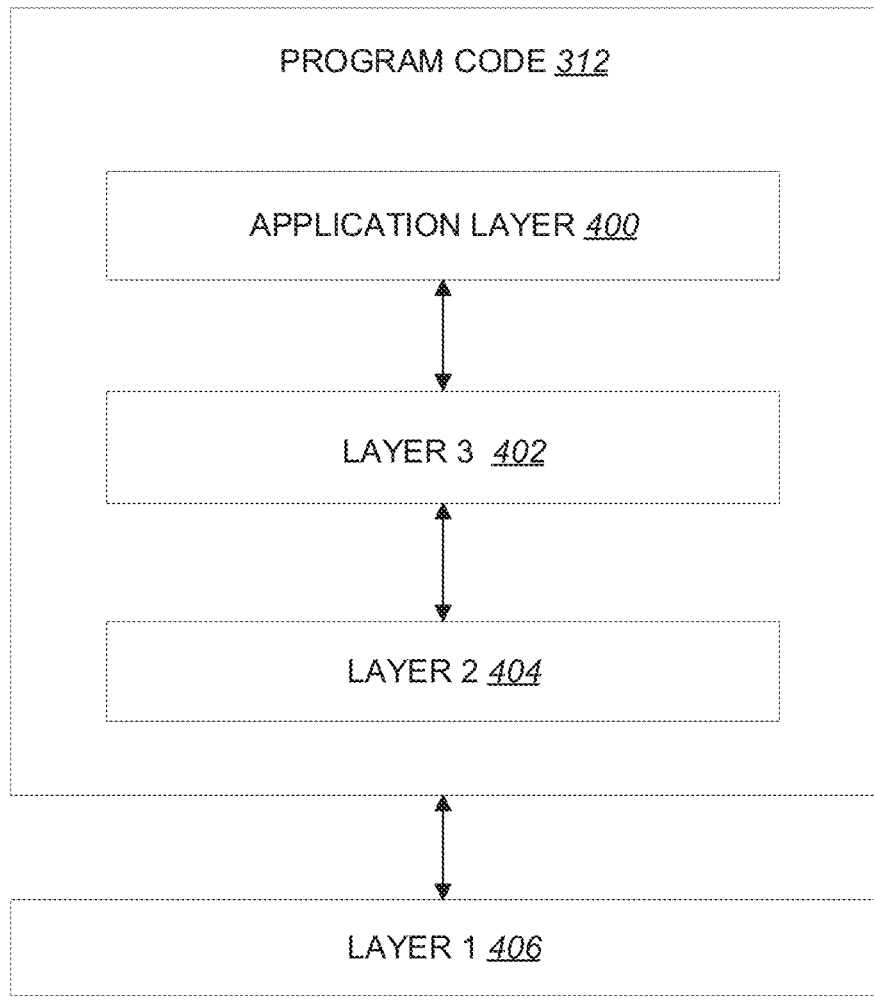
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Figure 6:
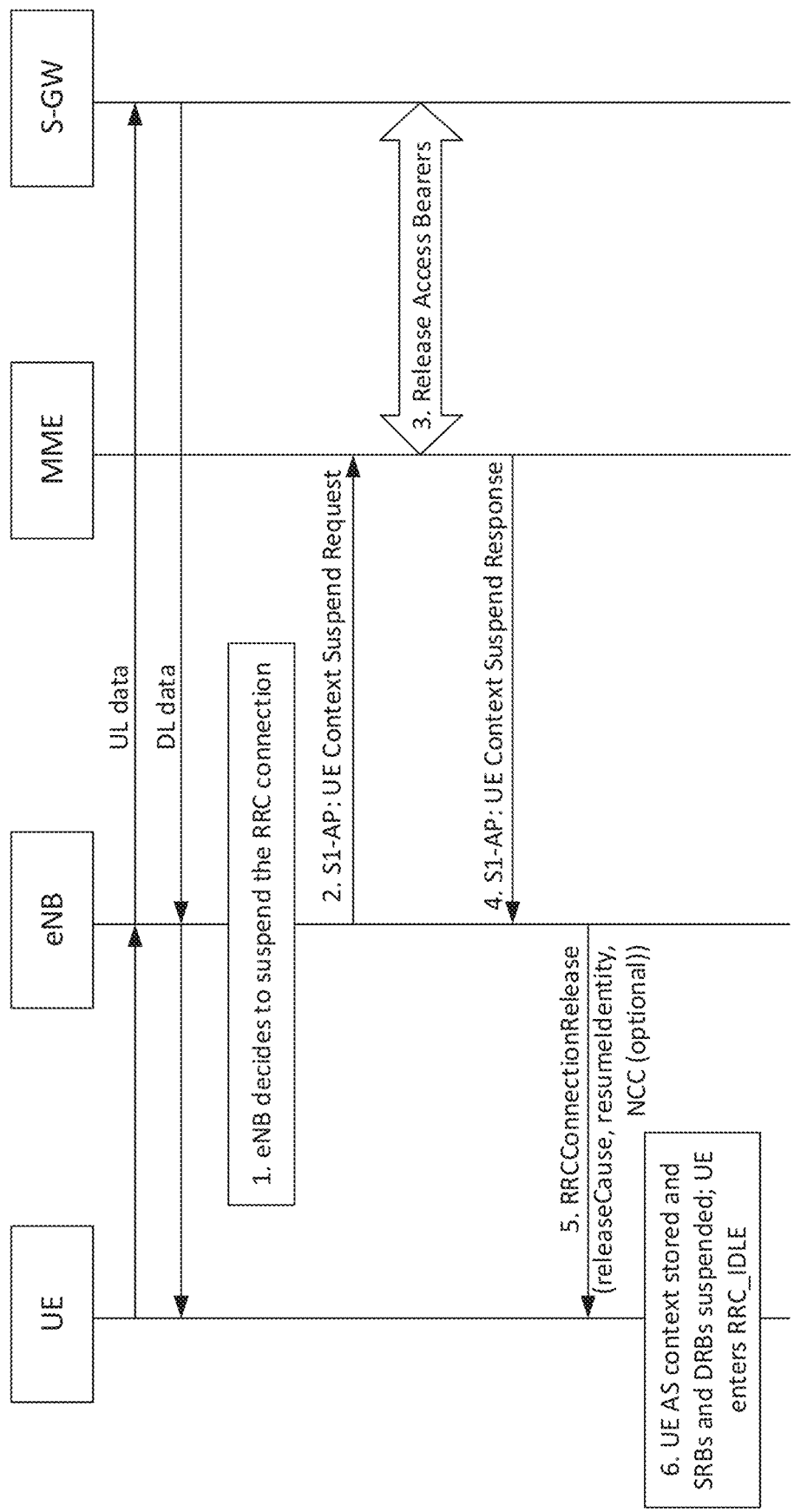
FIG. 6 is a diagram illustrating an exemplary scenario associated with RRC Connection Suspend procedure according to one exemplary embodiment.
Figure 7:
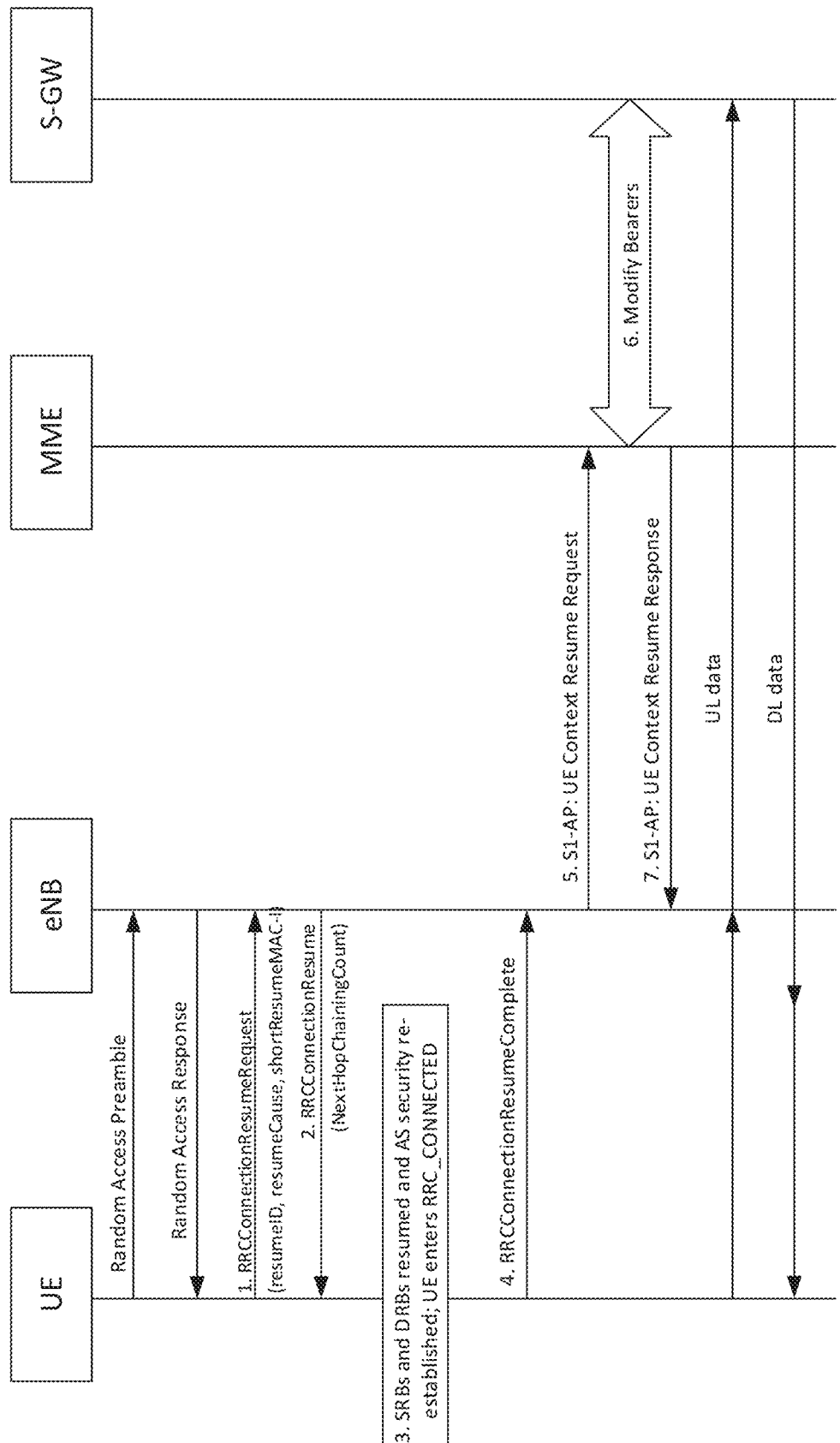
FIG. 7 is a diagram illustrating an exemplary scenario associated with RRC Connection Resume procedure according to one exemplary embodiment.
Figure 9:
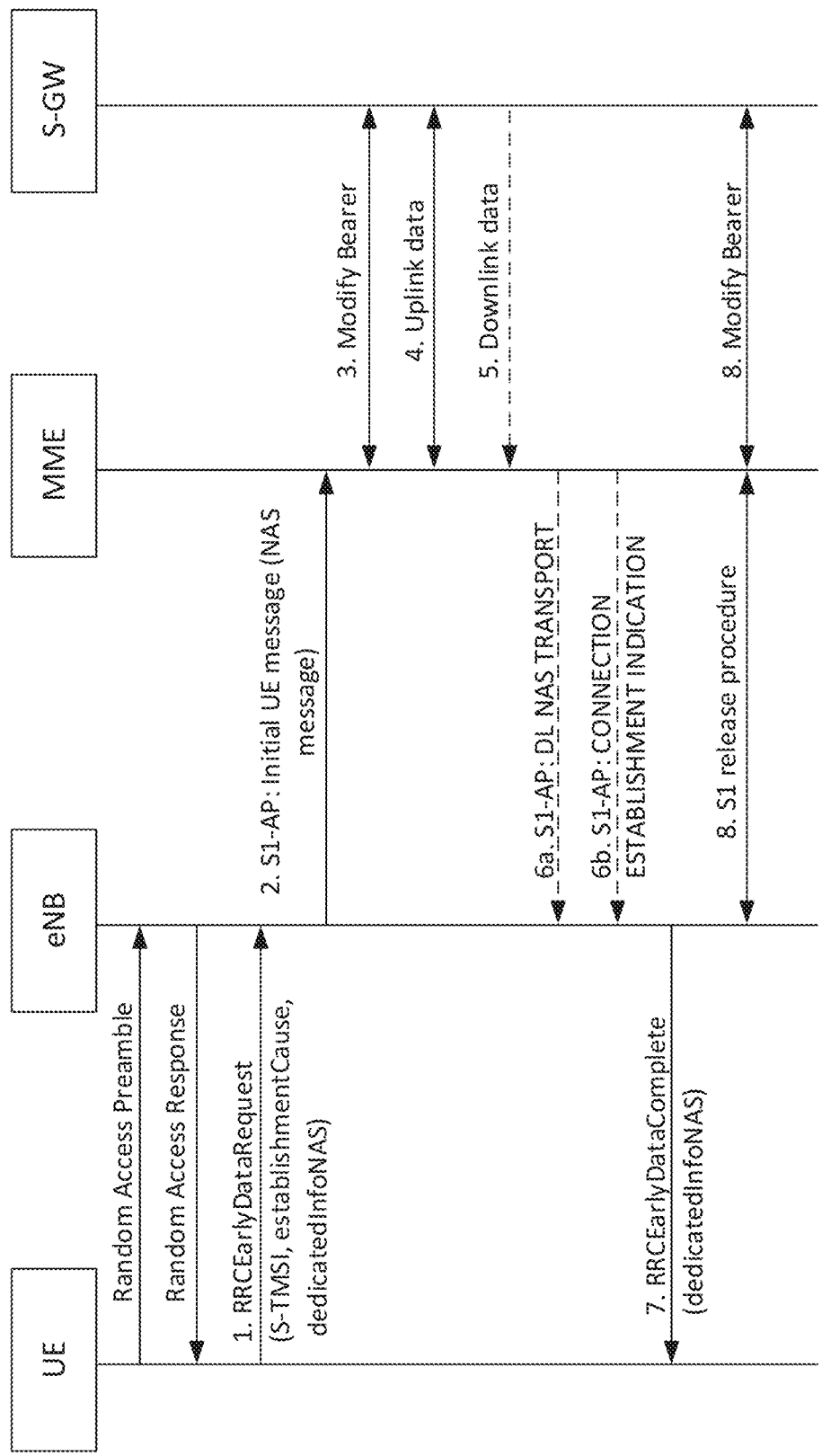
FIG. 9 is a diagram illustrating an exemplary scenario associated with Early Data Transmission (EDT) for Control Plane CIoT EPS optimizations according to one exemplary embodiment.
Figure 10:
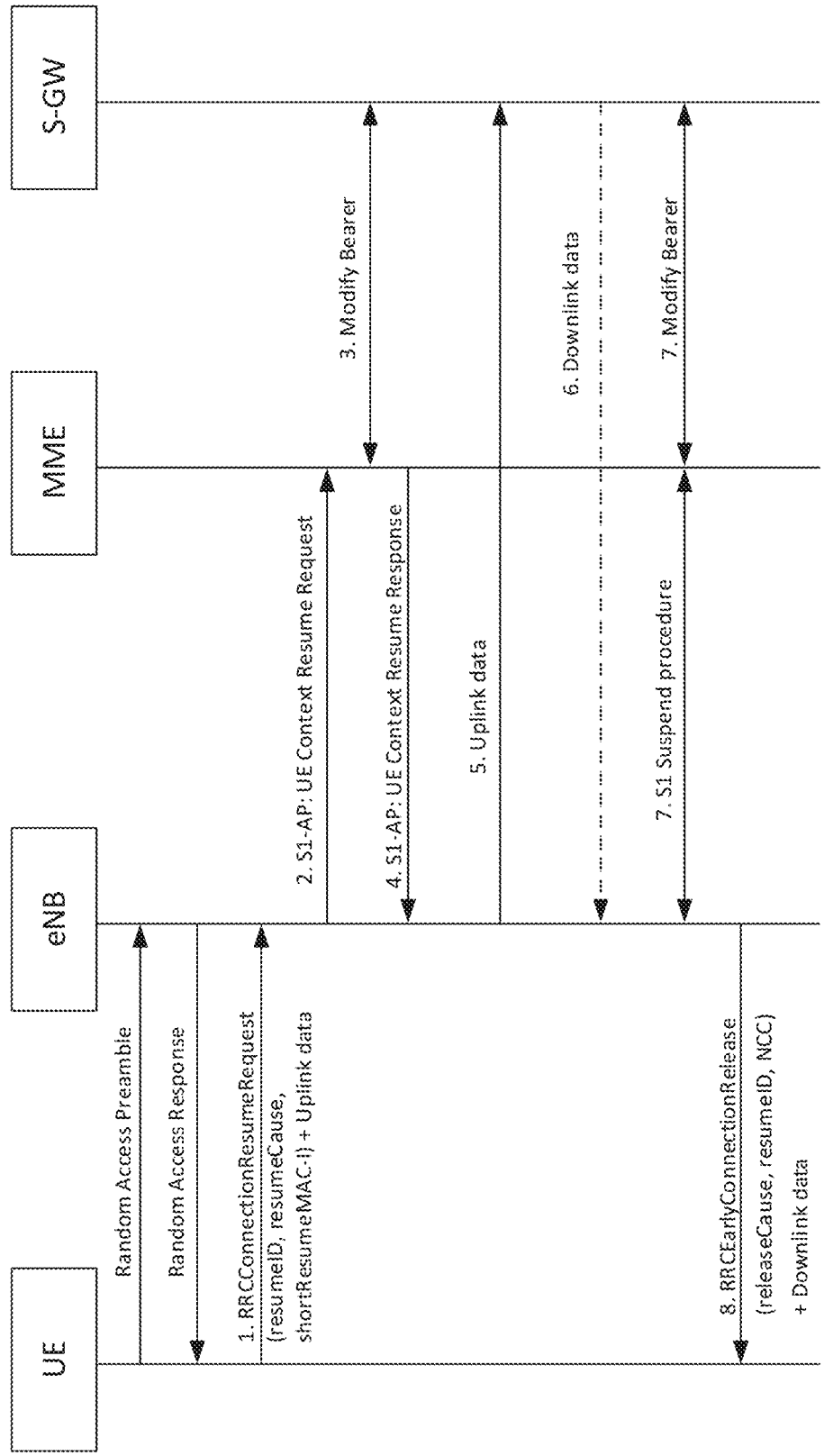
FIG. 10 is a diagram illustrating an exemplary scenario associated with EDT for User Plane CIoT EPS optimizations according to one exemplary embodiment.
Figure 11:
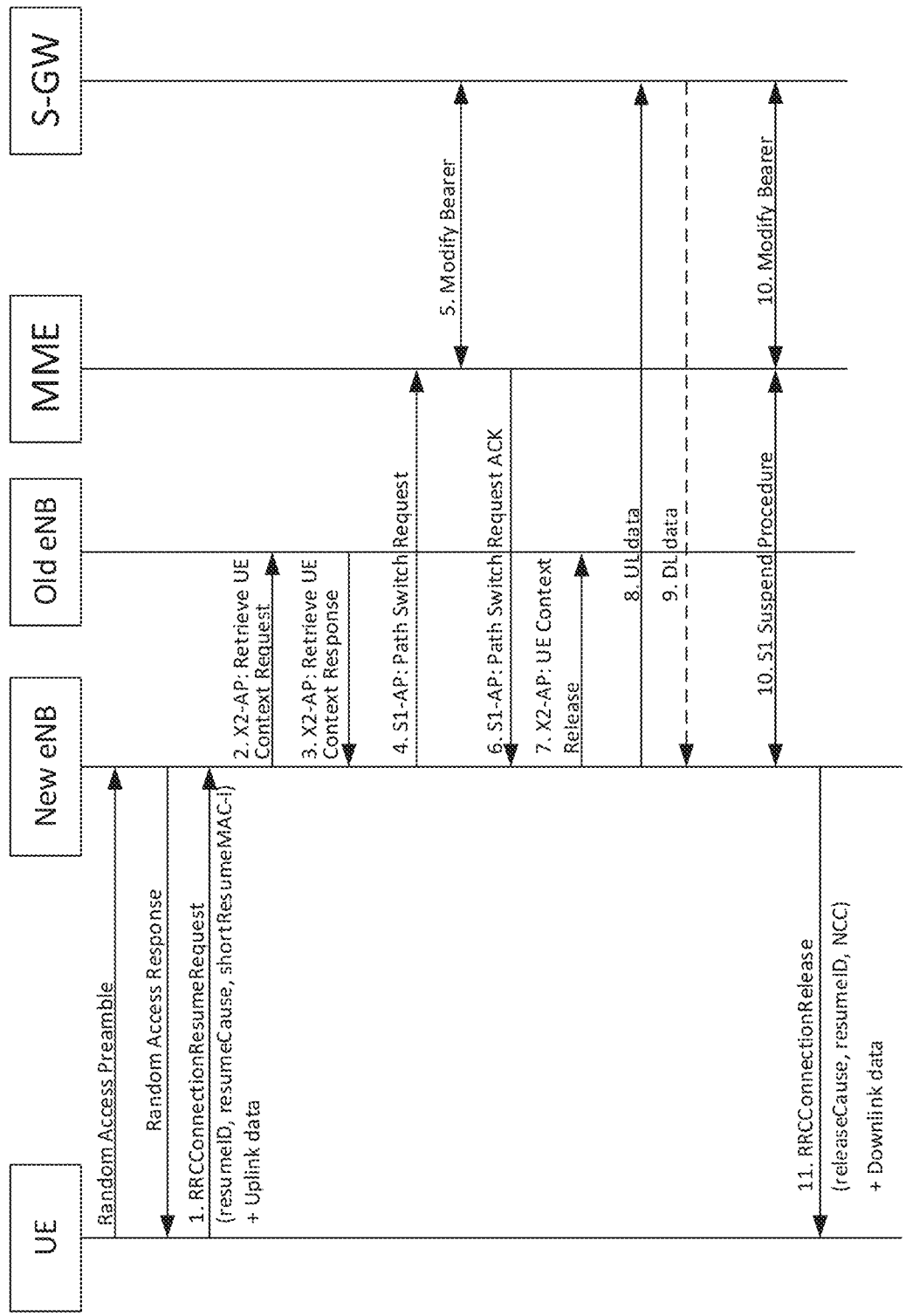
FIG. 11 is a diagram illustrating an exemplary scenario associated with EDT for User Plane CIoT EPS optimizations according to one exemplary embodiment.

Description related to Cellular Internet of Things (CIoT) signalling reduction optimizations and Early Data Transmission (EDT) in LTE is provided in 3GPP TS 36.300 V15.5.0. Notably, FIG. 7.3a.2-1 of Section 7.3a.2 of 3GPP TS 36.300 V15.5.0, entitled "The RRC connection established for Control Plane CIoT EPS Optimizations", is reproduced herein as FIG. 5. FIG. 7.3a.3-1 of Section 7.3a.3 of 3GPP TS 36.300 V15.5.0, entitled "RRC Connection Suspend procedure", is reproduced herein as FIG. 6. FIG. 7.3a.3-2 of Section 7.3a.3 of 3GPP TS 36.300 V15.5.0, entitled "RRC Connection Resume procedure", is reproduced herein as FIG. 7. FIG. 7.3a.3-3 of Section 7.3a.3 of 3GPP TS 36.300 V15.5.0, entitled "RRC Connection Resume procedure in different eNB", is reproduced herein as FIG. 8. FIG. 7.3b-1 of Section 7.3b.2 of 3GPP TS 36.300 V15.5.0, entitled "EDT for Control Plane CIoT EPS Optimizations", is reproduced herein as FIG. 9. FIG. 7.3b-2 of Section 7.3b.3 of 3GPP TS 36.300 V15.5.0, entitled "EDT for User Plane CIoT EPS Optimizations", is reproduced herein as FIG. 10. FIG. 7.3b-3 of Section 7.3b.3 of 3GPP TS 36.300 V15.5.0, entitled "EDT for User Plane CIoT EPS Optimizations in different eNB", is reproduced herein as FIG. 11. Parts of 3GPP TS 36.300 V15.5.0 are quoted below:

7.3 Transport of NAS Messages

The AS provides reliable in-sequence delivery of NAS messages in a cell. During handover, message loss or duplication of NAS messages can occur.

In E-UTRAN, NAS messages are either concatenated with RRC messages or carried in RRC without concatenation. Upon arrival of concurrent NAS messages for the same UE requiring both concatenation with RRC for the high priority queue and also without concatenation for the lower priority queue, the messages are first queued as necessary to maintain in-sequence delivery.

In downlink, when an EPS bearer (EPC) or PDU Session (5GC) establishment or release procedure is triggered, or for EDT in case of Control Plane CIoT EPS optimization, the NAS message should normally be concatenated with the associated RRC message. When the EPS bearer (EPC) or PDU Session (5GC) is modified and when the modification also depends on a modification of the radio bearer, the NAS message and associated RRC message should normally be concatenated. Concatenation of DL NAS with RRC message is not allowed otherwise. In uplink, concatenation of NAS messages with RRC message is used only for transferring the initial NAS message during connection setup and for EDT in case of Control Plane CIoT EPS optimization. Initial Direct Transfer is not used in E-UTRAN and no NAS message is concatenated with RRC connection request.

Multiple NAS messages can be sent in a single downlink RRC message during EPS bearer (EPC) or PDU Session (5GC) establishment or modification. In this case, the order of the NAS messages in the RRC message shall be kept the same as that in the corresponding S1-AP (EPC) or NG-AP (5GC) message in order to ensure the in-sequence delivery of NAS messages.

NOTE: NAS messages are integrity protected and ciphered by PDCP, in addition to the integrity protection and ciphering performed by NAS.

7.3a CIoT Signalling Reduction Optimizations

7.3a.1 General

Which solution of CIoT signalling reduction optimizations to be used is configured over NAS signalling between the UE and the MME.

For NB-IoT, PDCP is not used while AS security is not activated.

7.3a.2 Control Plane CIoT EPS Optimizations

The RRC connection established for Control Plane CIoT EPS optimizations, as defined in TS 24.301 [20] is characterized as below:

A UL NAS signalling message or UL NAS message carrying data can be transmitted in a UL RRC container message (see FIG. 7.3a.2-1). A DL NAS signaling or DL NAS data can be transmitted in a DL RRC container message;

for NB-IoT:
RRC connection reconfiguration is not supported;
Data radio bearer (DRB) is not used;
AS security is not used;
A non-anchor carrier can be configured for all unicast transmissions during RRC connection establishment or re-establishment.

There is no differentiation between the different data types (i.e. IP, non-IP or SMS) in the AS.

FIG. 7.3a.2-1: The RRC connection established for Control Plane CIoT EPS Optimizations

7.3a.3 User Plane CIoT EPS Optimizations

The RRC connection established for User Plane CIoT EPS optimization, as defined in TS 24.301 [20], is characterized as below:

A RRC connection suspend procedure is used at RRC connection release, the eNB may request the UE to retain the UE AS context including UE capability in RRC_IDLE;

A RRC connection resume procedure is used at transition from RRC_IDLE to RRC_CONNECTED where previously stored information in the UE as well as in the eNB is utilised to resume the RRC connection. In the message to resume, the UE provides a Resume ID to be used by the eNB to access the stored information required to resume the RRC connection;

At suspend-resume, security is continued. Re-keying is not supported in RRC connection resume procedure. The short MAC-I is reused as the authentication token at RRC connection reestablishment procedure and RRC connection resume procedure by the UE. The eNB provides the NCC in the RRCConnectionResume message as well. And also the UE resets the COUNT;

Multiplexing of CCCH and DTCH in the transition from RRC_IDLE to RRC CONNECTED is not supported;

For NB-IoT, a non-anchor carrier can be configured for all unicast transmissions when an RRC connection is re-established, resumed or reconfigured additionally when an RRC connection is established.

The RRC connection suspend and resume procedures are illustrated in FIGS. 7.3a.3-1 and 7.3a.3-2, respectively. Note that the description here is only intended as an overview and all parameters are therefore not listed in the message flows.

FIG. 7.3a.3-1: RRC Connection Suspend Procedure
 1. Due to some triggers, e.g. the expiry of a UE inactivity timer, the eNB decides to suspend the RRC connection.
 2. The eNB initiates the S1-AP UE Context Suspend procedure to inform the MME that the RRC connection is being suspended.
 3. The MME requests the S-GW to release all S1-U bearers for the UE.
 4. MME Acks step 2.
 5. The eNB suspends the RRC connection by sending an RRCConnectionRelease message with the release Cause set to rrc-Suspend. The message includes the Resume ID which is stored by the UE. Optionally, for EDT, the message also includes the NextHopChainingCount which is stored by the UE.
 6. The UE stores the AS context, suspends all SRBs and DRBs, and enters RRC_IDLE.

FIG. 7.3a.3-2: RRC Connection Resume Procedure
 1. At some later point in time (e.g. when the UE is being paged or when new data arrives in the uplink buffer) the UE resumes the connection by sending an RRCConnectionResumeRequest to the eNB. The UE includes its Resume ID, the establishment cause, and authentication token. The authentication token is calculated in the same way as the short MAC-I used in RRC connection re-establishment and allows the eNB to verify the UE identity.
 2. Provided that the Resume ID exists and the authentication token is successfully validated, the eNB responds with an RRCConnectionResume. The message includes the Next Hop Chaining Count (NCC) value which is required in order to re-establish the AS security.
 3. The UE resumes all SRBs and DRBs and re-establishes the AS security. The UE is now in RRC_CONNECTED.
 4. The UE responds with an RRCConnectionResumeComplete confirming that the RRC connection was resumed successfully, along with an uplink Buffer Status Report, and/or UL data, whenever possible, to the eNB.
 5. The eNB initiates the S1-AP Context Resume procedure to notify the MME about the UE state change.
 6. The MME requests the S-GW to activate the S1-U bearers for the UE.
 7. MME Acks step 5.

An RRC connection can also be resumed in an eNB (the new eNB) different from the one where the connection was suspended (the old eNB). Inter eNB connection resumption is handled using context fetching, whereby the new eNB retrieves the UE context from the old eNB over the X2 interface. The new eNB provides the Resume ID which is used by the old eNB to identify the UE context. This is illustrated in FIG. 7.3a.3-3.

FIG. 7.3a.3-3: RRC Connection Resume Procedure in Different eNB
 1. Same as step 1 in the intra eNB connection resumption.
 2. The new eNB locates the old eNB using the Resume ID and retrieves the UE context by means of the X2-AP Retrieve UE Context procedure.
 3. The old eNB responds with the UE context associated with the Resume ID.
 4. Same as step 2 in the intra eNB connection resumption.
 5. Same as step 3 in the intra eNB connection resumption.
 6. Same as step 4 in the intra eNB connection resumption.
 7. The new eNB initiates the S1-AP Path Switch procedure to establish a S1 UE associated signalling connection to the serving MME and to request the MME to resume the UE context.
 8. The MME requests the S-GW to activate the S1-U bearers for the UE and updates the downlink path.
 9. MME Acks step 7.
 10. After the S1-AP Path Switch procedure the new eNB triggers release of the UE context at the old eNB by means of the X2-AP UE Context Release procedure.

For a NB-IoT UE that supports Control Plane CIoT EPS optimization and S1-U data transfer or User Plane CIoT EPS optimization, as defined in TS 24.301 [20], PDCP is not used until AS security is activated.

7.3b EDT 7.3b.1 General

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

7.3b.2 EDT for Control Plane CIoT EPS Optimizations

EDT for Control Plane CIoT EPS optimizations, as defined in TS 24.301 [20], is characterized as below:

Uplink user data are transmitted in a NAS message concatenated in UL RRCEarlyDataRequest message on CCCH;

Downlink user data are optionally transmitted in a NAS message concatenated in DL RRCEarlyDataComplete message on CCCH;

There is no transition to RRC CONNECTED.

The EDT procedure for Control Plane CIoT EPS optimizations is illustrated in FIG. 7.3b-1.

FIG. 7.3b-1: EDT for Control Plane CIoT EPS Optimizations

0. Upon connection establishment request for Mobile Originated data from the upper layers, the UE initiates the early data transmission procedure and selects a random access preamble configured for EDT.
1. UE sends RRCEarlyDataRequest message concatenating the user data on CCCH.
2. The eNB initiates the S1-AP Initial UE message procedure to forward the NAS message and establish the S1 connection. The eNB may indicate in this procedure that this connection is triggered for EDT.
3. The MME requests the S-GW to re-activate the EPS bearers for the UE.
4. The MME sends the uplink data to the S-GW.
5. If downlink data are available, the S-GW sends the downlink data to the MME.
6. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.
7. If no further data are expected, the eNB can send the RRCEarlyDataComplete message on CCCH to keep the UE in RRC_IDLE. If downlink data were received in step 6, they are concatenated in RRCEarlyDataComplete message.
8. The S1 connection is released and the EPS bearers are deactivated.

NOTE 1: If the MME or the eNB decides to move the UE in RRC_CONNECTED mode, RRCConnectionSetup message is sent in step 7 to fall back to the legacy RRC Connection establishment procedure; the eNB will discard the zero-length NAS PDU received inRRCConnectionSetupComplete message.

NOTE 2: If neither RRCEarlyDataComplete nor, in case of fallback, RRCConnectionSetup is received in response to RRCEarlyDataRequest, the UE considers the UL data transmission not successful.

7.3b.3 EDT for User Plane CIoT EPS Optimizations

EDT for User Plane CIoT EPS optimizations, as defined in TS 24.301 [20], is characterized as below:

The UE has been provided with a NextHopChainingCount in the RRCConnectionRelease message with suspend indication;

Uplink user data are transmitted on DTCH multiplexed with UL RRCConnectionResumeRequest message on CCCH;

Downlink user data are optionally transmitted on DTCH multiplexed with DL RRCConnectionRelease message on DCCH;

The short resume MAC-I is reused as the authentication token for RRCConnectionResumeRequest message and is calculated using the integrity key from the previous connection;

The user data in uplink and downlink are ciphered. The keys are derived using the NextHopChainingCount provided in the RRCConnectionRelease message of the previous RRC connection;

The RRCConnectionRelease message is integrity protected and ciphered using the newly derived keys;

There is no transition to RRC CONNECTED.

The EDT procedure for User Plane CIoT EPS optimizations is illustrated in FIG. 7.3b-2.

FIG. 7.3b-2: EDT for User Plane CIoT EPS Optimizations

0. Upon connection resumption request for Mobile Originated data from the upper layers, the UE initiates the early data transmission procedure and selects a random access preamble configured for EDT.
1. The UE sends an RRCConnectionResumeRequest to the eNB, including its Resume ID, the establishment cause, and an authentication token. The UE resumes all SRBs and DRBs, derives new security keys using the NextHopChainingCount provided in the RRCConnectionRelease message of the previous connection and re-establishes the AS security. The user data are ciphered and transmitted on DTCH multiplexed with the RRCConnectionResumeRequest message on CCCH.
2. The eNB initiates the S1-AP Context Resume procedure to resume the S1 connection and re-activate the S1-U bearers.
3. The MME requests the S-GW to re-activate the S1-U bearers for the UE.
4. The MME confirms the UE context resumption to the eNB.
5. The uplink data are delivered to the S-GW.
6. If downlink data are available, the S-GW sends the downlink data to the eNB.
7. If no further data are expected from the S-GW, the eNB can initiate the suspension of the S1 connection and the deactivation of the S1-U bearers.
8. The eNB sends the RRCConnectionRelease message to keep the UE in RRC_IDLE. The message includes the release Cause set to rrc-Suspend, the resumeID, the NextHopChainingCount and drb-ContinueROHC which are stored by the UE. If downlink data were received in step 6, they are sent ciphered on DTCH multiplexed with the RRCConnectionRelease message on DCCH.

NOTE 1: If the MME or eNB decides the UE to move in RRC_CONNECTED mode, RRCConnectionResume message is sent in step 7 to fall back to the RRC Connection resume procedure. In that case, the RRCConnectionResume message is integrity protected and ciphered with the keys derived in step 1 and the UE ignores the NextHopChainingCount included in the RRCConnectionResume message. Downlink data can be transmitted on DTCH multiplexed with the RRCConnectionResume message. In addition, an RRCConnectionSetup can also be sent in step 7 to fall back to the RRC Connection establishment procedure.

NOTE 2: If neither RRCConnectionRelease nor, in case of fallback, RRCConnectionResume is received in response to RRCConnectionResumeRequest for EDT, the UE considers the UL data transmission not successful.

For EDT for User Plane CIoT EPS Optimizations, an RRC connection can also be resumed in an eNB (the new eNB) different from the one where the connection was suspended (the old eNB). Inter eNB connection resumption is handled using context fetching, whereby the new eNB retrieves the UE context from the old eNB over the X2 interface. The new eNB provides the Resume ID which is used by the old eNB to identify the UE context. This is illustrated in FIG. 7.3b-3.

Figure: 7.3b-3: EDT for User Plane CIoT EPS Optimizations in Different eNB

1. Same as step 1 in the intra eNB connection resumption.
2. The new eNB locates the old eNB using the Resume ID and retrieves the UE context by means of the X2-AP Retrieve UE Context procedure.
3. The old eNB responds with the UE context associated with the Resume ID.
4. The new eNB initiates the S1-AP Path Switch procedure to establish a S1 UE associated signalling connection to the serving MME and to request the MME to resume the UE context.
5. The MME requests the S-GW to activate the S1-U bearers for the UE and updates the downlink path.
6. MME Acks step 5.
7. After the S1-AP Path Switch procedure the new eNB triggers release of the UE context at the old eNB by means of the X2-AP UE Context Release procedure.
8. Same as step 5 in the intra eNB connection resumption.
9. Same as step 6 in the intra eNB connection resumption.
10. Same as step 7 in the intra eNB connection resumption.
11. Same as step 8 in the intra eNB connection resumption.

Transmission in preconfigured uplink resources (PUR) is discussed in 3GPP RAN1. Some agreements made by RAN1 are quoted below from 3GPP RAN1 #94 Chairman's Note.

Agreement
Idle mode based pre-configured UL resources is supported for UEs in possession of a valid TA
   FFS: Validation mechanism for TA
   FFS: How the pre-configured UL resources is acquired
Agreement
For transmission in preconfigured UL resources, the UE may use the latest TA of which its validity can be confirmed
   Transmission in PURs is discussed in 3GPP RAN1. Some agreements made by RAN1 are quoted below from 3GPP RAN1 #94 bis Chairman's Note.
Agreement
In idle mode, the UE will at least consider one or more of the following attributes when validating TA (combination of multiple attributes is allowed):
   Serving cell changes (serving cell refers the cell that the UE is camping on)
   Time Alignment Timer for idle mode
   Serving cell RSRP changes (serving cell refers the cell that the UE is camping on)
   FFS Other attributes:
   Neighbour cell RSRP change
   TDOA of >=2 eNBs
   TA History
   Subscription based UE differentiation
   Others not precluded (for example, attributes that need to be considered for high mobility UEs)
Note that UE power consumption should be taken into account for the FFS attributes
Agreement
Dedicated preconfigured UL resource is defined as an PUSCH resource used by a single UE
   PUSCH resource is time-frequency resource
   Dedicated PUR is contention-free
Contention-free shared preconfigured UL resource (CFS PUR) is defined as an PUSCH resource simultaneously used by more than one UE
   PUSCH resource is at least time-frequency resource
   CFS PUR is contention-free
Contention-based shared preconfigured UL resource (CBS PUR) is defined as an PUSCH resource simultaneously used by more than one UE
   PUSCH resource is at least time-frequency resource
   CBS PUR is contention-based (CBS PUR may require contention resolution)
Agreement
In IDLE mode, HARQ is supported for transmission in dedicated PUR
   A single HARQ process is supported,
   FFS whether more than one HARQ processes are supported
   FFS: The design of the corresponding MPDCCH search space
Agreement
For UL transmission in preconfigured resource, fallback mechanism to RACH/EDT procedures is supported.
Agreement
For transmission in preconfigured UL resources, an RRC idle UE may use the latest TA that passed the validation criteria
Agreement
Pre-configured UL resources for transmission of data are indicated by RRC signaling. At least UE-specific RRC signaling is supported.
Agreement
   The resource configuration includes at least the following
   Time domain resources including periodicity(s)
   Frequency domain resources
   TBS(s)/MCS(s)
Agreement
Dedicated preconfigured UL resource is defined as an NPUSCH resource used by a single UE
   NPUSCH resource is time-frequency resource
   Dedicated PUR is contention-free
Contention-free shared preconfigured UL resource (CFS PUR) is defined as an NPUSCH resource simultaneously used by more than one UE
   NPUSCH resource is at least time-frequency resource
   CFS PUR is contention-free
Contention-based shared preconfigured UL resource (CBS PUR) is defined as an NPUSCH resource simultaneously used by more than one UE
   NPUSCH resource is at least time-frequency resource
   CBS PUR is contention-based (CBS PUR may require contention resolution)
   Transmission in PURs is discussed in 3GPP RAN1. Some agreements made by RAN1 are quoted below from 3GPP RAN1 #95 Chairman's Note.
Additional MTC Enhancements
Agreement
For dedicated PUR in idle mode, the UE may skip UL transmissions.
   FFS: Resource release mechanism
   FFS: Whether or not to support mechanism to disable skipping by eNB
Agreement
If multi-TB grant is not enabled, a dedicated PUR allocation is associated to only a single TB and single HARQ process
   FFS: if multi-TB grant is enabled/supported
Agreement
In idle mode, at least the following TA validation attributes are supported:
   Serving cell changes (serving cell refers the cell that the UE is camping on)

Time Alignment Timer for idle mode
Serving cell RSRP changes (serving cell refers the cell that the UE is camping on)
Based on RSRP measurement definition in existing Rel-15 TS36.214
Include in LS to RAN2, RAN4 to consider in their work.
Agreement
The UE can be configured to use at least these TA validation attributes:
Time Alignment Timer for idle mode
Serving cell RSRP changes
Note: the configuration shall support disabling of the TA validation attributes
Include in LS to RAN2, RAN4
For further Study:
TA validation attributes:
Subscription based UE differentiation (or Stationary indication in held in subscription)
Cell specific indication where TA is valid within that cell
Agreement
Include in LS to RAN2, RAN4:
RAN1 assumes that a UE transitioning from EDT/connected to idle mode can use the valid TA that was used while in EDT/connected mode.
Agreement
For dedicated PUR in idle mode, UL grant for HARQ retransmission is transmitted in MPDCCH search space
FFS: Details on the search space (for example USS, CSS)
Agreement
For dedicated PUR in idle mode, upon successful decoding by eNB of a PUR transmission, the UE can expect an explicit ACK
FFS: if ACK is sent on MPDCCH (layer 1) and/or PDSCH (layer 2/3)
Include in LS to RAN2, RAN4.
Agreement
For dedicated PUR in idle mode, upon unsuccessful decoding by eNB of a PUR transmission, the UE can expect
an UL GRANT for retransmission on the MPDCCH, or
FFS: a NACK, or
FFS: no explicit ACK
Include in LS to RAN2, RAN4.
Additional Enhancements for NB-IoT
Agreement
In idle mode, at least the following TA validation attributes are supported:
Serving cell changes (serving cell refers the cell that the UE is camping on)
Time Alignment Timer for idle mode
Serving cell NRSRP changes (serving cell refers the cell that the UE is camping on)
Based on NRSRP measurement definition in existing Rel-15 TS36.214
Send LS to RAN2, RAN4 to consider in their work. All the agreements with 'include in LS to RAN2, RAN4' for NB-IoT and eMTC should be captured in this LS. The LS is endorsed in R1-1813778
Agreement
The UE can be configured to use at least these TA validation attributes:
Time Alignment Timer for idle mode
Serving cell NRSRP changes
Note: the configuration shall support disabling of the TA validation attributes
Include in LS to RAN2, RAN4.

For Further Study:
TA validation attributes:
Subscription based UE differentiation (or Stationary indication in held in subscription)
Cell specific indication where TA is valid within that cell
Agreement
Include in LS to RAN2, RAN4:
RAN1 assumes that a UE transitioning from EDT/connected to idle mode can use the valid TA that was used while in EDT/connected mode.
Agreement
For dedicated PUR in idle mode, the UE may skip UL transmissions.
FFS: Resource release mechanism
FFS: Whether or not to support mechanism to disable skipping by eNB
Agreement
In idle mode, only one HARQ process is supported for dedicated PUR
Agreement
For dedicated PUR in idle mode, UL grant for HARQ retransmission is transmitted in search space
FFS: Details on the search space (for example USS, CSS)
Transmission in PURs is discussed in 3GPP RAN1. Some agreements made by RAN1 are quoted below from 3GPP RAN1 #96 Chairman's Note.
Additional MTC Enhancements
Agreement
In idle mode, the TA validation configuration can include "PUR Time Alignment Timer"
Where the UE considers the TA as invalid if the (current time—time at last TA update)>the PUR Time Alignment Timer
Details on how to specify the "PUR Time Alignment Timer" is up to RAN2
Agreement
In idle mode, when the UE validates TA, the UE considers the TA for the previous serving cell as invalid if the serving cell changes
Above applies for the case where the UE is configured to use the serving cell change attribute
Agreement
For dedicated PUR in idle mode, the Dedicated PUR ACK is at least sent on MPDCCH
RAN2 can decide if a higher layer PUR ACK is also supported
Agreement
For dedicated PUR in idle mode, the PUR search space configuration shall be included in the PUR configuration.
PUR search space is the search space where UE monitors for MPDCCH
FFS: Whether PUR search space is common or UE specific
Agreement
When the TA is validated and found to be invalid and the UE has data to send, the UE can obtain a valid TA and may send data via legacy RACH or EDT procedures
FFS whether only TA is acquired and then data sent on PUR is supported
FFS other approaches to obtain a valid TA
Agreement
When the UE is configured to use several TA validation criteria, the TA is valid only when all the configured TA validation criteria are satisfied.
Agreement
For dedicated PUR, in idle mode, the PUR resource configuration includes at least the following Time domain resources including periodicity(s)
  Note: also includes number of repetitions, number of RUs, starting position
  Frequency domain resources
  TBS(s)/MCS(s)
  Power control parameters
  Legacy DMRS pattern
Agreement
In idle mode, at least the following PUR configurations and PUR parameters may be updated after a PUR transmission:
  Timing advance adjustment
  UE TX power adjustment
  FFS: Repetition adjustment for PUSCH
  FFS: Whether the above update is done in L1 and/or higher layer
Agreement
In idle mode, the PUR search space configuration includes at least the following:
  MPDCCH narrowband location
  MPDCCH repetitions and aggregation levels
  MPDCCH starting subframe periodicity (variable G)
  Starting subframe position (alpha_offset)
Agreement
For dedicated PUR in idle mode, the PUR resource configuration includes at least the following
  A PUSCH frequency hopping indication to enable or disable legacy frequency hopping
Agreement
In idle mode, a UE can be configured such that TA is always valid within a given cell.
  FFS: up to RAN2 how to implement e.g. PUR Time Alignment Timer=infinity
Additional Enhancements for NB-IoT
Agreement
When the UE is configured to use several TA validation criteria, the TA is valid only when all the configured TA validation criteria are satisfied.
Agreement
For dedicated PUR in idle mode, the PUR search space configuration shall be included in the PUR configuration.
  PUR search space is the search space where UE monitors for NPDCCH
  FFS: Whether PUR search space is common or UE specific
Agreement
In idle mode, the TA validation configuration can include "PUR Time Alignment Timer"
  Where the UE considers the TA as invalid if the (current time—time at last TA update) >the PUR Time Alignment Timer
  Details on how to specify the "PUR Time Alignment Timer" is up to RAN2
Agreement
In idle mode, when the UE validates TA, the UE considers the TA for the previous serving cell as invalid if the serving cell changes
  Above applies for the case where the UE is configured to use the serving cell change attribute
Agreement
For dedicated PUR in idle mode, the dedicated PUR ACK is at least sent on NPDCCH
  FFS: Whether to introduce new field in DCI or reuse existing field
  RAN2 can decide if a higher layer PUR ACK is also supported Agreement
When the TA is validated and found to be invalid and the UE has data to send, the UE can obtain a valid TA and may send data via legacy RACH or EDT procedures
  FFS whether only TA is acquired and then data sent on PUR is supported
  FFS other approaches to obtain a valid TA
Agreement
In idle mode, at least the following PUR configurations and PUR parameters may be updated after a PUR transmission:
  Timing advance adjustment
  UE TX power adjustment
  FFS: Repetition adjustment for NPUSCH
  FFS: Whether the above update is done in L1 and/or higher layer
Agreement
In idle mode, the PUR search space configuration includes at least the following:
  NPDCCH repetitions and aggregation levels
  NPDCCH starting subframe periodicity (variable G)
  Starting subframe position (alpha_offset)
Agreement
For dedicated PUR, in idle mode, the PUR resource configuration includes at least the following
  Time domain resources including periodicity(s)
  Note: also includes number of repetitions, number of RUs, starting position
  Frequency domain resources
  TBS(s)/MCS(s)
  Power control parameters
  Legacy DMRS pattern
  Transmission in PURs is discussed in 3GPP RAN1. Some agreements made by RAN1 are quoted below from 3GPP RAN1 #96bis Chairman's Note.
Additional MTC Enhancements
Working Assumption #1
In idle mode, updating PUR configurations and/or PUR parameters via L1 signalling after a PUR transmission is supported
  FFS: Which PUR configurations and PUR parameters will be signaled via L1
  FFS: Definition of PUR configurations and PUR parameters
The working assumption will be automatically confirmed if for some cases L2/L3 signaling is not needed. If RAN2 decides that L2/L3 signaling is needed for all cases, the working assumption will be reverted.
Working Assumption #2
For dedicated PUR
  During the PUR search space monitoring, the UE monitors for DCI scrambled with a RNTI assuming that the RNTI is not shared with any other UE
    Note: It is up to RAN2 to decide how the RNTI is signaled to UE or derived
  FFS if the UE monitors any additional RNTI which may be shared with other UEs.
    Note: The same RNTI may be used over non-overlapping time and/or frequency resources
Send an LS to RAN2 to include two above working assumptions. Ask whether the first bullet in working assumption #2 is feasible. If it is concluded that working assumption #2 is feasible, the working assumption #2 will be automatically confirmed.
Agreement
The UE monitors the MPDCCH for at least a time period after a PUR transmission FFS: Details of the time period
FFS: UE behaviour if nothing is received in the time period
FFS: If and how often UE monitors MPDCCH after a PUR allocation in which it has not transmitted
Agreement
The value(s) of RSRP threshold(s) is UE specific
Agreement
The power control parameters within the PUR configuration, shall at least include:
  Target UL power level (P_0) for the PUR transmission
Agreement
For dedicated PUR in idle mode, the PUR configuration is configured by UE-specific RRC signaling.
Additional Enhancements for NB-IoT
Agreement
In idle mode, a UE can be configured such that TA is always valid within a given cell.
  Up to RAN2 how to implement
    e.g. PUR Time Alignment Timer or NRSRP Threshold=infinity
Agreement
The value(s) of NRSRP threshold(s) is UE specific
Agreement
The UE monitors the NPDCCH for at least a time period after a PUR transmission.
  FFS: Details of the time period
  FFS: UE behaviour if nothing is received in that time period.
  FFS: If and how often UE monitors NPDCCH after a PUR allocation in which it has not transmitted
Agreement
Reuse existing field(s) of DCI format N0 to convey the dedicated PUR ACK
Agreement
After data transmission on PUR, upon unsuccessful decoding by eNB, the UE can expect an UL grant for retransmission on NPDCCH. Other behaviors are FFS.
Working Assumption #1
In idle mode, updating PUR configurations and/or PUR parameters via L1 signalling after a PUR transmission is supported
  FFS: Which PUR configurations and PUR parameters will be signaled via L1
  FFS: Definition of PUR configurations and PUR parameters
The working assumption will be automatically confirmed if for some cases L2/L3 signaling is not needed. If RAN2 decides that L2/L3 signaling is needed for all cases, the working assumption will be reverted.
Working Assumption #2
For dedicated PUR
  During the PUR search space monitoring, the UE monitors for DCI scrambled with a RNTI assuming that the RNTI is not shared with any other UE
    Note: It is up to RAN2 to decide how the RNTI is signaled to UE or derived
    FFS if the UE monitors any additional RNTI which may be shared with other UEs.
    Note: The same RNTI may be used over non-overlapping time and/or frequency resources
Send an LS to RAN2 to include two above working assumptions. Ask whether the first bullet in working assumption #2 is feasible. If it is concluded that working assumption #2 is feasible, the working assumption #2 will be automatically confirmed. (LS is approved in eMTC agenda item—see 6.2.1.2)

Agreement
For dedicated PUR in idle mode, the PUR configuration is configured by UE-specific RRC signaling.
  Transmission in PURs is discussed in 3GPP RAN1. Some agreements made by RAN1 are quoted below from 3GPP RAN1 #97 Chairman's Note.
Additional MTC Enhancements
Agreement
For a given UE, for dedicated PUR in idle mode and for a given CE mode, the same size DCI, the same PUR M-PDCCH candidates, and the same RNTI is used for all DCI messages for unicast transmissions.
Agreement
For dedicated PUR in idle mode and for HD-FDD UEs, the start of the PUR SS Window is [x] subframes after the end PUR transmission
  FFS: Value of x, and if x is fixed or signaled
  FFS: FD-FDD UEs, TDD UEs
  FFS: Support for monitoring of PUR SS Window before PUR transmission
  Note: The PUR SS Window is the time period where the UE monitors the MPDCCH for at least a time period after a PUR transmission
Agreement
For dedicated PUR in idle mode,
The maximum mPDDCH repetitions, $r_{max}$-mPDCCH-PUR, is included in the PUR configuration
Agreement
For dedicated PUR in idle mode, the duration of the PUR SS window is configured by eNB
How the duration is configured, and the possible values, will be decided by RAN2.
Agreement
For dedicated PUR in idle mode, the CE mode is
Option 1: explicitly configured in the PUR configuration.
Option2: based on CE mode of last connection
Down select in RAN1 #98
Agreement
Select one of the following in RAN1 #98
  Alt1: In idle mode, the PUR search space PRB pairs is configured between {2, 2+4, 4} PRBs
  Alt2: In idle mode, the PUR search space PRB pairs is fixed to 2+4 PRBs
Agreement
For dedicated PUR in idle mode, if a UE skips a PUR transmission, it is not mandated to monitor the associated PUR SS window
Additional Enhancements for NB-IoT
Agreement
For dedicated PUR in idle mode and for HD-FDD UEs, the start of the PUR SS Window is [x] subframes after the end PUR transmission
  FFS: Value of x, and if x is fixed or signaled
  FFS: Support for monitoring of PUR SS Window before PUR transmission
  Note: The PUR SS Window is the time period where the UE monitors the NPDCCH for at least a time period after a PUR transmission
Agreement
NPDCCH candidates are determined by USS like search space
  FFS: Other details on the USS like search space
  Type2-CSS can also be discussed as part of the FFS
Conclusion
CBS PUR is not supported in Rel-16
For Further Discussion Aspects related to notifying eNB of unused PUR resources.

Potential enhancements of power control mechanisms for PUR. (The baseline is the existing NB-IoT open loop power control.)

Figure 8:
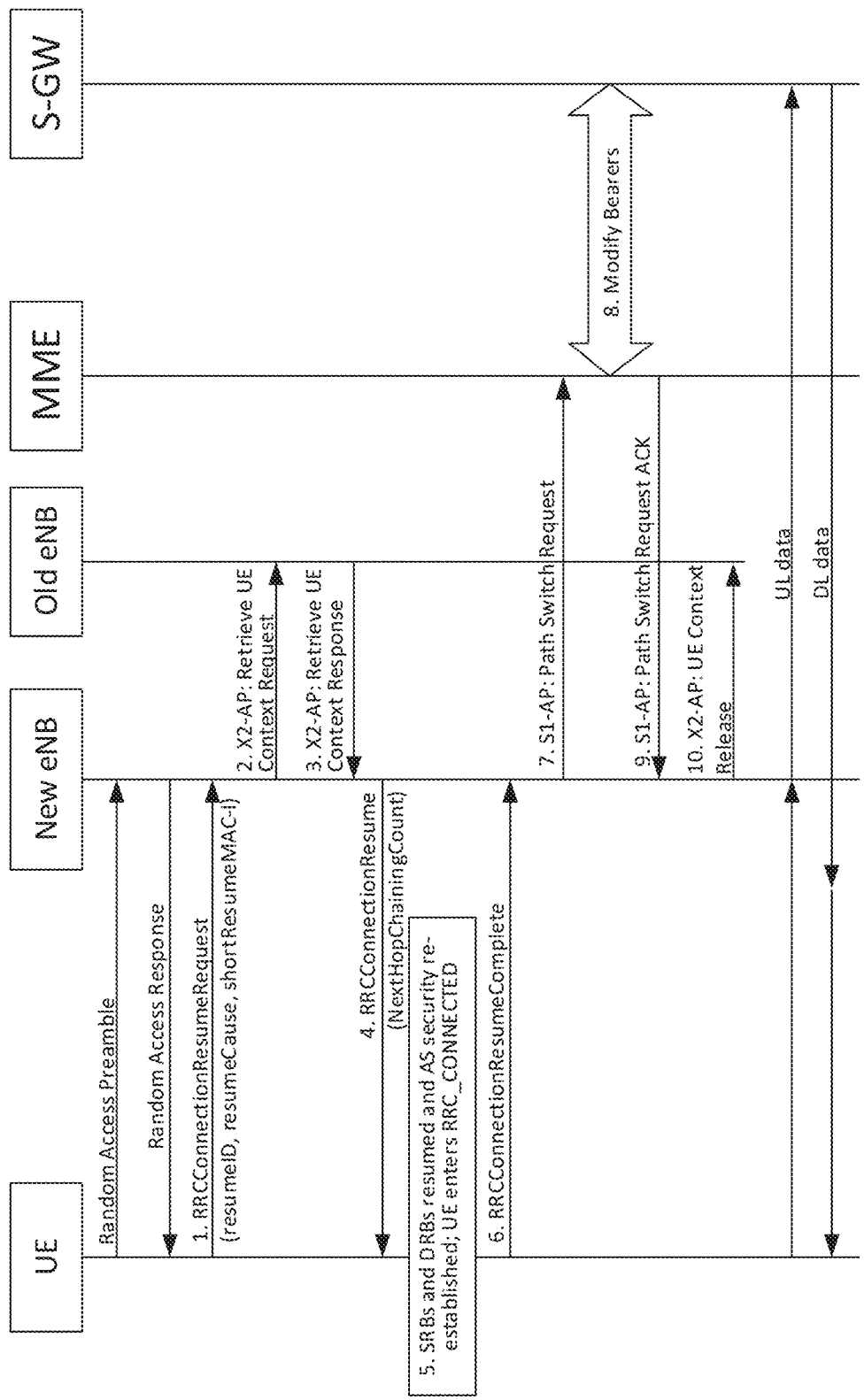
FIG. 8 is a diagram illustrating an exemplary scenario associated with RRC Connection Resume procedure according to one exemplary embodiment.
Figure 12:
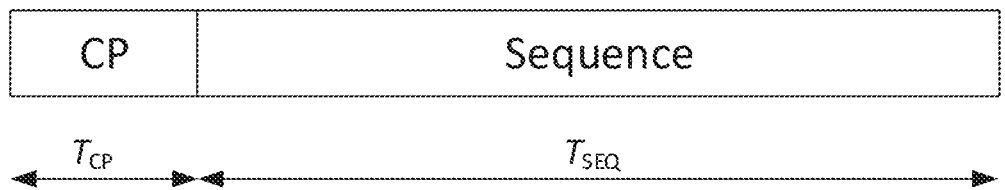
FIG. 12 is a diagram illustrating a random access preamble format according to one exemplary embodiment.
Figure 13:
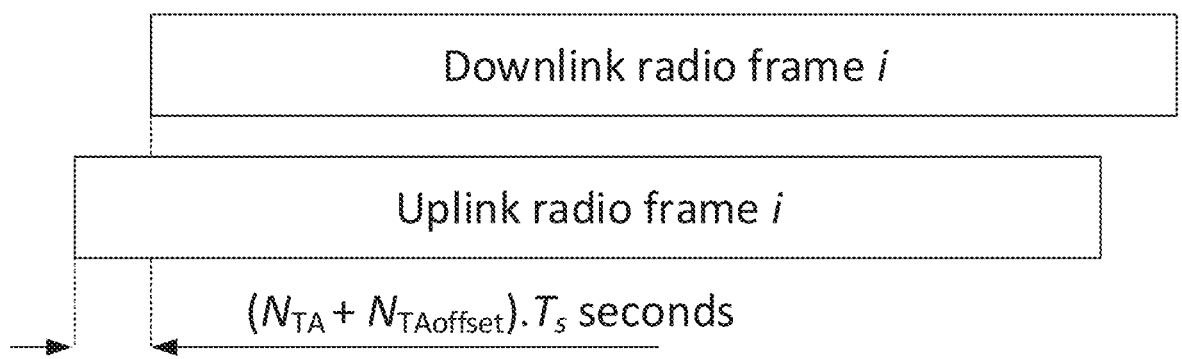
FIG. 13 is a diagram illustrating an uplink-downlink timing relationship according to one exemplary embodiment.

Time and frequency structure for Random Access (RA) preamble is described in 3GPP TS 36.211 V15.5.0. Notably, FIG. 5.7.1-1 of Section 5.7.1 of 3GPP TS 36.211 V15.5.0, entitled "Random access preamble format", is reproduced herein as FIG. 12. FIG. 8.1-1 of Section 8.1 of 3GPP TS 36.211 V15.5.0, entitled "Uplink-downlink timing relation", is reproduced herein as FIG. 13. Parts of 3GPP TS 36.211 V15.5.0 are quoted below:

5.7 Physical Random Access Channel

5.7.1 Time and Frequency Structure

Figure 5:
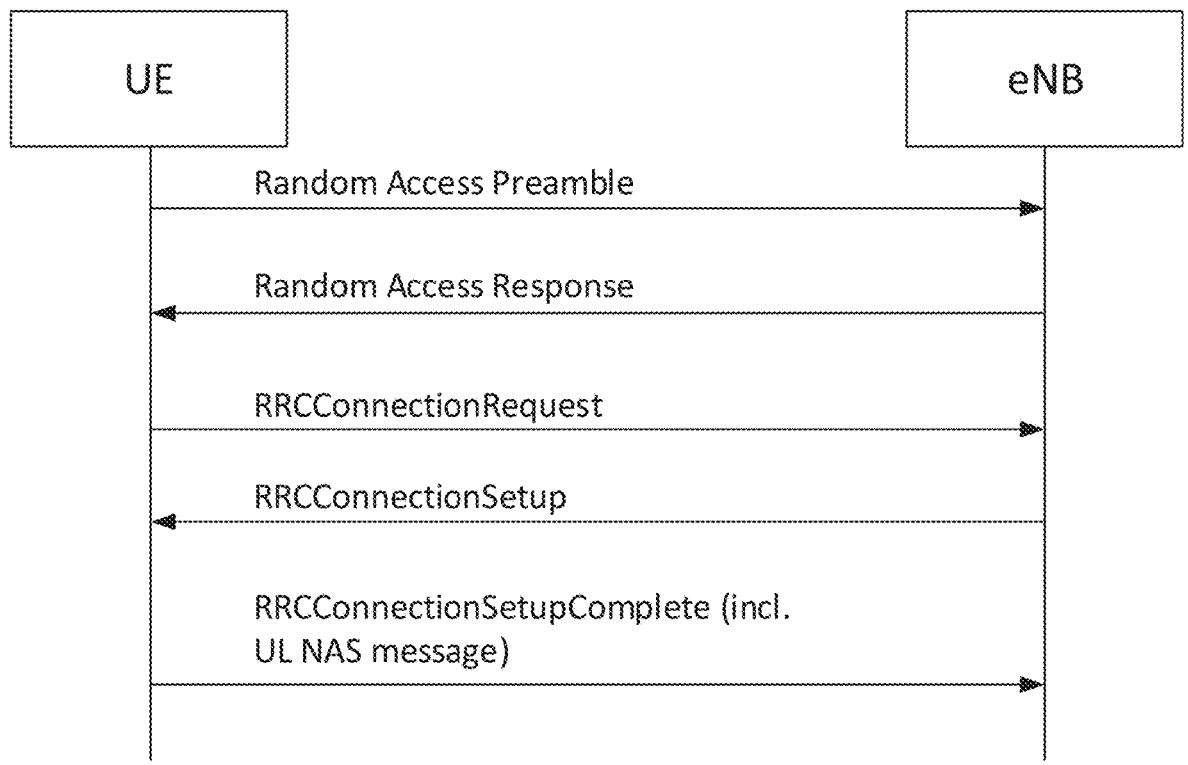
FIG. 5 is a diagram illustrating an exemplary scenario associated with a Radio Resource Control (RRC) connection established for Control Plane Cellular Internet of Things (CIoT) Evolved Packet System (EPS) optimizations according to one exemplary embodiment.

The physical layer random access preamble, illustrated in FIG. 5.7.1-1, consists of a cyclic prefix of length $T_{CP}$ and a sequence part of length $T_{SEQ}$. The parameter values are listed in Table 5.7.1-1 and depend on the frame structure and the random access configuration. Higher layers control the preamble format.

FIG. 5.7.1-1: Random Access Preamble Format

TABLE 5.7.1-1

Random access preamble parameters

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 (see Note) | $448 \cdot T_s$ | $4096 \cdot T_s$ |

NOTE:
Frame structure type 2 and special subframe configurations with UpPTS lengths $4384 \cdot T_s$ and $5120 \cdot T_s$ only assuming that the number of additional SC-FDMA symbols in UpPTS X in Table 4.2-1 is 0.

The transmission of a random access preamble, if triggered by the MAC layer, is restricted to certain time and frequency resources. These resources are enumerated in increasing order of the subframe number within the radio frame and the physical resource blocks in the frequency domain such that index 0 correspond to the lowest numbered physical resource block and subframe within the radio frame. PRACH resources within the radio frame are indicated by a PRACH configuration index, where the indexing is in the order of appearance in Table 5.7.1-2 and Table 5.7.1-4.

For non-BL/CE UEs there are up to two PRACH configurations in a cell. The first PRACH configuration is configured by higher layers with a PRACH configuration index (prach-ConfigurationIndex) and a PRACH frequency offset $n_{PRBoffset}^{RA}$ (prach-FrequencyOffset). The second PRACH configuration (if any) is configured by higher layers with a PRACH configuration index (prach-ConfigurationIndex-HighSpeed) and a PRACH frequency offset $n_{PRBoffset}^{RA}$ (prach-FrequencyOffsetHighSpeed).

For BL/CE UEs, for each PRACH coverage enhancement level, there is a PRACH configuration configured by higher layers with a PRACH configuration index (prach-ConfigurationIndex), a PRACH frequency offset $\bar{n}_{PRBoffset}^{RA}$ (prach-FrequencyOffset), a number of PRACH repetitions per attempt $N_{rep}^{PRACH}$ (numRepetitionPerPreambleAttempt) and optionally a PRACH starting subframe periodicity $N_{start}^{PRACH}$ (prach-StartingSubframe). PRACH of preamble format 0-3 is transmitted $N_{rep}^{PRACH} \geq 1$ times, whereas PRACH of preamble format 4 is transmitted one time only. For BL/CE UEs and for each PRACH coverage enhancement level, if frequency hopping is enabled for a PRACH configuration by the higher-layer parameter prach-HoppingConfig, the value of the parameter $n_{PRBoffset}^{RA}$ depends on the SFN and the PRACH configuration index and is given by In case the PRACH configuration index is such that a PRACH resource occurs in every radio frame when calculated as below from Table 5.7.1-2 or Table 5.7.1-4, $$n_{PRB\ offset}^{RA} = \begin{cases} \bar{n}_{PRB\ offset}^{RA} & \text{if } n_f \bmod 2 = 0 \\ (\bar{n}_{PRB\ offset}^{RA} + f_{PRB,hop}^{PRACH}) \bmod N_{RB}^{UL} & \text{if } n_f \bmod 2 = 1 \end{cases}$$

otherwise $$n_{PRB\ offset}^{RA} = \begin{cases} \bar{n}_{PRB\ offset}^{RA} & \text{if } \left\lfloor \dfrac{n_f \bmod 4}{2} \right\rfloor = 0 \\ (\bar{n}_{PRB\ offset}^{RA} + f_{PRB,hop}^{PRACH}) \bmod N_{RB}^{UL} & \text{if } \left\lfloor \dfrac{n_f \bmod 4}{2} \right\rfloor = 1 \end{cases}$$

where $n_f$ is the system frame number corresponding to the first subframe for each PRACH repetition, $f_{PRB,hop}^{PRACH}$ corresponds to a cell-specific higher-layer parameter prach-HoppingOffset. If frequency hopping is not enabled for the PRACH configuration then $n_{PRBoffset}^{RA} = \bar{n}_{PRBoffset}^{RA}$.

For frame structure type 1 with preamble format 0-3, for each of the PRACH configurations there is at most one random access resource per subframe.

Table 5.7.1-2 lists the preamble formats according to Table 5.7.1-1 and the subframes in which random access preamble transmission is allowed for a given configuration in frame structure type 1. The start of the random access preamble shall be aligned with the start of the corresponding uplink subframe at the UE assuming $N_{TA}=0$, where $N_{TA}$ is defined in clause 8.1. For PRACH configurations 0, 1, 2, 15, 16, 17, 18, 31, 32, 33, 34, 47, 48, 49, 50 and 63 the UE may for handover purposes assume an absolute value of the relative time difference between radio frame i in the current cell and the target cell of less than $153600 \cdot T_s$.

The first physical resource block $n_{PRB}^{RA}$ allocated to the PRACH opportunity considered for preamble formats 0, 1, 2 and 3 is defined as $n_{PRB}^{RA} = n_{PRBoffset}^{RA}$.

TABLE 5.7.1-2

Frame structure type 1 random access configuration for preamble formats 0-3

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |

TABLE 5.7.1-2-continued

Frame structure type 1 random access configuration for preamble formats 0-3

| PRACH Configuration Index | Preamble Format | System frame number | Subframe number |
|---|---|---|---|
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

For frame structure type 2 with preamble formats 0-4, for each of the PRACH configurations there might be multiple random access resources in an UL subframe (or UpPTS for preamble format 4) depending on the UL/DL configuration [see table 4.2-2]. Table 5.7.1-3 lists PRACH configurations allowed for frame structure type 2 where the configuration index corresponds to a certain combination of preamble format, PRACH density value, $D_{RA}$ and version index, $r_{RA}$. For frame structure type 2 with PRACH configuration indices 0, 1, 2, 20, 21, 22, 30, 31, 32, 40, 41, 42, 48, 49, 50, or with PRACH configuration indices 51, 53, 54, 55, 56, 57 in UL/DL configuration 3, 4, 5, the UE may for handover purposes assume an absolute value of the relative time difference between radio frame i in the current cell and the target cell is less than $153600 \cdot T_s$.

TABLE 5.7.1-3

Frame structure type 2 random access configurations for preamble formats 0-4

| PRACH configuration Index | Preamble Format | Density Per 10 ms $D_{RA}$ | Version $r_{RA}$ |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | N/A | N/A | N/A |
| 59 | N/A | N/A | N/A |
| 60 | N/A | N/A | N/A |
| 61 | N/A | N/A | N/A |
| 62 | N/A | N/A | N/A |
| 63 | N/A | N/A | N/A |

Table 5.7.1-4 lists the mapping to physical resources for the different random access opportunities needed for a certain PRACH density value, $D_{RA}$. Each quadruple of the format ($f_{RA}, t_{RA}^{(0)}, t_{RA}^{(1)}, t_{RA}^{(2)}$) indicates the location of a specific random access resource, where $f_{RA}$ is a frequency resource index within the considered time instance, $t_{RA}^{(0)}$=0,1,2 indicates whether the resource is reoccurring in all radio frames, in even radio frames, or in odd radio frames, respectively, $t_{RA}^{(1)}$=0,1 indicates whether the random access resource is located in first half frame or in second half frame, respectively, and where $t_{RA}^{(2)}$ is the uplink subframe number where the preamble starts, counting from 0 at the first uplink subframe between 2 consecutive downlink-to-uplink switch points, with the exception of preamble format 4 where $t_{RA}^{(2)}$ is denoted as (*). The start of the random access preamble formats 0-3 shall be aligned with the start of the corresponding uplink subframe at the UE assuming $N_{TA}$=0 and the random access preamble format 4 shall start 4832•$T_s$ before the end of the UpPTS at the UE, where the UpPTS is referenced to the UE's uplink frame timing assuming $N_{TA}$=0.

The random access opportunities for each PRACH configuration shall be allocated in time first and then in frequency if and only if time multiplexing is not sufficient to hold all opportunities of a PRACH configuration needed for a certain density value $D_{RA}$ without overlap in time. For preamble format 0-3, the frequency multiplexing shall be done according to $$n_{PRB}^{RA} = \begin{cases} n_{PRB\ offset}^{RA} + 6\left\lfloor \frac{f_{RA}}{2} \right\rfloor, & \text{if } f_{RA} \bmod 2 = 0 \\ N_{RB}^{UL} - 6 - n_{PRB\ offset}^{RA} - 6\left\lfloor \frac{f_{RA}}{2} \right\rfloor, & \text{otherwise} \end{cases}$$

where $N_{RB}^{UL}$ is the number of uplink resource blocks, $n_{PRB}^{RA}$ is the first physical resource block allocated to the PRACH opportunity considered and where $n_{PRB\ offset}^{RA}$ is the first physical resource block available for PRACH.

For preamble format 4, the frequency multiplexing shall be done according to $$n_{PRB}^{RA} = \begin{cases} 6 f_{RA}, & \text{if } ((n_f \bmod 2) \times (2 - N_{SP}) + t_{RA}^{(1)}) \bmod 2 = 0 \\ N_{RB}^{UL} - 6(f_{RA} + 1), & \text{otherwise} \end{cases}$$

where $n_f$ is the system frame number and where $N_{SP}$ is the number of DL to UL switch points within the radio frame.

For BL/CE UEs, only a subset of the subframes allowed for preamble transmission are allowed as starting subframes for the $N_{rep}^{PRACH}$ repetitions. The allowed starting subframes for a PRACH configuration are determined as follows:

Enumerate the subframes that are allowed for preamble transmission for the PRACH configuration as $n_{sf}^{RA}$=0, ... $N_{sf}^{RA}$−1 where $n_{sf}^{RA}$=0 and $n_{sf}^{RA}=N_{sf}^{RA}$−1 correspond to the two subframes allowed for preamble transmission with the smallest and the largest absolute subframe number $n_{sf}^{abs}$, respectively.

If a PRACH starting subframe periodicity $N_{start}^{PRACH}$ is not provided by higher layers, the periodicity of the allowed starting subframes in terms of subframes allowed for preamble transmission is $NP_{rep}^{PRACH}$. The allowed starting subframes defined over $n_{sf}^{RA}$=0, ... $N_{sf}^{RA}$−1 are given by $jN_{rep}^{PRACH}$ where j=0,1, 2, ....

If a PRACH starting subframe periodicity $N_{start}^{PRACH}$ is provided by higher layers, it indicates the periodicity of the allowed starting subframes in terms of subframes allowed for preamble transmission. The allowed starting subframes defined over $n_{sf}^{RA}$=0, ... $N_{sf}^{RA}$−1 are given by $jN_{start}^{PRACH}$+$N_{rep}^{PRACH}$ where j=0,1,2, ....

No starting subframe defined over $n_{sf}^{RA}$=0, ... $N_{sf}^{RA}$−1 such that $n_{sf}^{RA} > N_{sf}^{RA} - N_{rep}^{PRACH}$ is allowed.

Each random access preamble occupies a bandwidth corresponding to 6 consecutive resource blocks for both frame structures.

8 Timing 8.1 Uplink-Downlink Frame Timing

Transmission of the uplink radio frame number i from the UE shall start ($N_{TA}$+$N_{TA\ offset}$)×$T_s$ seconds before the start of the corresponding downlink radio frame at the UE.

FIG. 8.1-1: Uplink-Downlink Timing Relation

Except for the cases mentioned in Table 8.1-1, Table 8.1-2 and Table 8.1-3, the range of $N_{TA}$ is: 0≤$N_{TA}$20512.

For frame structure type 1 $N_{TA\ offset}$=0 and for frame structure type 2 $N_{TA\ offset}$=624 unless stated otherwise in [4]. Note that not all slots in a radio frame may be transmitted. One example hereof is TDD, where only a subset of the slots in a radio frame is transmitted.

$N_{TA}$ is defined in different ranges depending on the UE configuration according to Table 8.1-1, Table 8.1-2 and Table 8.1-3. In case of subslot based transmission (Table 8.1-2 and Table 8.1-3), the UE is configured by higher layer signalling a processing timeline and an associated range of timing advance.

TABLE 8.1-1

Ranges of $N_{TA}$ for a UE configured with SCG, short processing time or slot-based transmission in both DL and UL

| Range of $N_{TA}$ | Condition |
| --- | --- |
| 0 ≤ $N_{TA}$ ≤ 4096 | if the UE is configured with a SCG |
| 0 ≤ $N_{TA}$ ≤ 6144 | if the UE is configured with shortProcessingTime (see 3GPP TS 36.331 [9]) |
| 0 ≤ $N_{TA}$ ≤ 9520 | if the UE is configured with dl-TTI-Length and ul-TTI-Length (see 3GPP TS 36.331 [9]) set to 'slot' for the serving cell |

TABLE 8.1-2

Ranges of $N_{TA}$ for a UE configured with subslot-based transmission in both DL
and UL (dl-TTI-Length and ul-TTI-Length, see 3GPP TS 36.331 [9], set to 'subslot')

| Range of $N_{TA}$ | proc-Timeline |
|---|---|
| $0 \leq N_{TA} \leq 2048$ | nplus4set1 |
| $0 \leq N_{TA} \leq 10816$ | nplus6set1 |
| $0 \leq N_{TA} \leq 5120$ | nplus6set2 |
| $0 \leq N_{TA} \leq 13888$ | nplus8set2 |

NOTE 1:
See 3GPP TS 36.331 [9]

TABLE 8.1-3

Ranges of $N_{TA}$ for a UE configured with subslot-based transmission in
DL and slot-based transmission in UL (dl-TTI-Length and ul-TTI-Length,
see 3GPP TS 36.331 [9], set to 'subslot' and 'slot', respectively)

| Range of $N_{TA}$ | proc-Timeline |
|---|---|
| $0 \leq N_{TA} \leq 2048$ | nplus4set1 |
| $0 \leq N_{TA} \leq 9520$ | nplus6set1 |
| $0 \leq N_{TA} \leq 5120$ | nplus6set2 |
| $0 \leq N_{TA} \leq 9520$ | nplus8set2 |

NOTE 1:
See 3GPP TS 36.331 [9]

In all other cases the range of $N_{TA}$ is: $0 \leq N_{TA} \leq 20512$.

The term "Machine-Type Communications UE (MTC UE)", as used herein, may refer to a "Bandwidth reduced and Low complexity UE (BL UE)" and/or a "UE in enhanced coverage (UE in EC, UE in CE, CE UE)". The term "UE", as used herein, may refer to a MTC UE and/or a Narrow Band Internet of Things (NB-IoT) UE and/or a different type of UE. In RRC_IDLE mode (e.g., Radio Resource Control (RRC) idle mode), if a UE initiates a Random Access (RA) procedure, the RA procedure may be for Early-Data Transmission (EDT) and/or the RA procedure may not be for EDT. In RRC_IDLE mode, if the UE initiates a RA procedure, the RA procedure may be for Mobile-terminated EDT (MT-EDT) and/or may not be for MT-EDT. A contention-based RA procedure may comprise four steps, wherein messages transmitted and/or received in each step of the four steps are referred to as "Msg1", "Msg2", "Msg3", and/or "Msg4", respectively. A non-contention-based RA procedure may comprise two steps, wherein messages transmitted and/or received in each step of the two steps are referred to as "Msg1", and/or "Msg2", respectively. The term "Physical Downlink Control Channel (PDCCH)", as used herein, may refer to a Machine-Type Communications PDCCH (MPDCCH) for MTC UEs and/or a Narrowband PDCCH (NPDCCH) for NB-IoT UEs. The term "Physical Random Access Channel (PRACH)", as used herein, may refer to PRACH for MTC UEs and/or Narrowband PRACH (NPRACH) for NB-IoT UEs. The statement(s) described above in this paragraph may be generally applied to all the following paragraphs, unless otherwise specified.

In LTE Release 15, EDT is introduced in order to improve transmission efficiency and/or reduce power consumption for MTC UEs and/or NB-IoT UEs. EDT may be applicable for MTC UEs and/or NB-IoT UEs. EDT may be triggered in RRC_IDLE mode. After EDT is triggered, uplink user data (e.g. Mobile Originated data) may be included in a Msg3 during a RA procedure (e.g., Msg3 may correspond to a third message of the RA procedure), and a network may include downlink user data in Msg4 during the RA procedure (e.g., Msg4 may correspond to a fourth message of the RA procedure). One benefit of EDT is that uplink user data may be transmitted by a UE without the need for the UE to enter RRC_CONNECTED mode (e.g., RRC connected mode). It is also possible that EDT fallbacks to legacy RRC connection establishment/resume procedure, and/or that the uplink user data is transmitted after the UE enters RRC_CONNECTED mode. The Release 15 EDT may also be referred to as "Mobile-originated EDT (MO-EDT)".

There are at least two types of EDT (or MO-EDT).

A first type of EDT (or a first type of MO-EDT) is control plane EDT (CP-EDT) (e.g., EDT for Control Plane Cellular Internet of Things (CIoT) Evolved Packet System (EPS) optimizations). In CP-EDT, uplink user data is transmitted in a Non-Access Stratum (NAS) message concatenated in an uplink RRCEarlyDataRequest message on a Common Control Channel (CCCH). The uplink RRCEarlyDataRequest message may be included in a Msg3 during a RA procedure (e.g., the Msg3 may correspond to a third message of the RA procedure, where the Msg3 is transmitted by a UE to an eNB). Downlink user data may be transmitted in a NAS message concatenated in a downlink RRCEarlyDataComplete message on a CCCH. The downlink RRCEarlyData-Complete message may be included in a Msg4 during the RA procedure (e.g., the Msg4 may correspond to a fourth message of the RA procedure, where the Msg4 is transmitted by the eNB to the UE). If a Mobility Management Entity (MME) and/or the eNB decide to change the UE to RRC_CONNECTED mode (e.g., change the UE from RRC_IDLE mode to RRC_CONNECTED mode), a RRCConnectionSetup message may be sent (to the UE) in Msg4 to fall back to the legacy RRC Connection establishment procedure.

A second type of EDT (or a second type of MO-EDT) is user plane EDT (UP-EDT) (e.g., EDT for User Plane CIoT EPS optimizations). In UP-EDT, uplink user data is transmitted on a Dedicated Traffic Channel (DTCH) multiplexed with an uplink RRCConnectionResumeRequest message on a CCCH. In some embodiments, a DTCH Service Data Unit (SDU) and/or a CCCH SDU are included in a Msg3 during a RA procedure (e.g., the Msg3 may correspond to a third message of the RA procedure, where the Msg3 is transmitted by a UE to an eNB). Downlink user data may be transmitted on a DTCH multiplexed with a downlink RRCConnection-Release message on a Dedicated Control Channel (DCCH). A DTCH SDU and/or a DCCH SDU may be included in a Msg4 during the RA procedure. If a MME and/or the eNB decide to change the UE to RRC_CONNECTED mode (e.g., change the UE from RRC_IDLE mode to RRC_CONNECTED mode), a RRCConnectionResume message (and/or downlink user data) is sent (to the UE) in the Msg4 to fall back to the RRC Connection resume procedure.

In LTE Release 16, in order to further improve transmission efficiency and/or reduce power consumption for MTC UEs and/or NB-IoT UEs, transmission in preconfigured uplink resources (PUR) may be introduced. According to RAN1 agreements (at least some of which are quoted in the foregoing description), a UE may use one or more dedicated PURs in RRC_IDLE mode if criteria are met. The term "dedicated PUR", as used herein, may correspond to one or more resources that the UE assumes are not shared with other UEs. The criteria at least include valid Time Alignment. A validation mechanism for Time Alignment (e.g., a mechanism for determining whether a Time Alignment is valid) is still under discussion. The validation mechanism may include a Time Alignment Timer for idle mode (and/or for PUR). The UE may consider that a Time Alignment associated with the UE is valid if the Time Alignment Timer (for idle mode and/or for PUR) is running.

In some embodiments, the UE performs a PUR transmission (e.g., a transmission of data to a network via one or more PURs) on a PUR occasion. In some embodiments, the UE determines the PUR occasion based on time and frequency information of one or more PURs configured in a dedicated PUR configuration of the UE. HARQ is supported for one or more transmissions using a dedicated PUR to improve reliability. After the UE performs the PUR transmission, the UE monitors PDCCH during a configurable time period (e.g., a PUR Search Space Window). The network may include a PUR search space configuration in the dedicated PUR configuration and/or the UE may monitor PDCCH based on the PUR search space configuration after the PUR transmission (e.g., the PUR search space configuration may correspond to the configurable time period). In addition, one or more fallback mechanisms to RACH and/or EDT procedures may also be supported. Details of the one or more fallback mechanisms are under discussion.

The dedicated PUR configuration may be provided in a dedicated signaling to the UE when the UE is in RRC_CONNECTED mode. One or more configured PURs (e.g., one or more PURs configured by the dedicated PUR configuration) may be valid when the UE is in RRC_IDLE mode. The one or more configured PURs may not require lower layer activation. The UE may not use the one or more configured PURs if no data is available for transmission. For one or more dedicated PURs, because the network can identify which UE is performing a transmission using the one or more dedicated PURs, contention resolution may not be needed. In some embodiments, the UE may perform two steps. A first step of the two steps comprises the transmission using PUR, and a second step of the two steps comprises reception of a network response associated with the transmission (e.g., the network response is also known as a "response for PUR" and/or a "PUR response"). The network response may be an acknowledgement of whether the transmission is successful or not (e.g., the network response may comprise HARQ feedback). The network response may be a dynamic uplink grant for retransmission (e.g., the network response may be the dynamic uplink grant for retransmission if the transmission is not successful). The network response may be downlink user data and/or a RRC message (e.g., at least one of a RRCEarlyDataComplete message, a RRCConnectionRelease message, etc.). The downlink user data and/or the RRC message may be scheduled by a dynamic downlink assignment. The dynamic uplink grant may be addressed to a first specific RNTI (e.g., a C-RNTI, a Temporary C-RNTI and/or a new RNTI). The dynamic downlink assignment may be addressed to a second specific RNTI (e.g., a C-RNTI, a Temporary C-RNTI and/or a new RNTI). The first specific RNTI and/or the second specific RNTI may be provided in the dedicated PUR configuration. The first specific RNTI and/or the second specific RNTI may be provided when UE is in RRC_CONNECTED mode. The first specific RNTI and the second specific RNTI may be the same (i.e. the first specific RNTI and the second specific RNTI may both correspond to a single RNTI). Alternatively and/or additionally, the first specific RNTI may be different than the second specific RNTI. If retransmission is required, such as where the transmission is not successful, the UE may perform retransmission in a next PUR occasion and/or based on the dynamic uplink grant (received in the second step). The UE monitors PDCCH during the configurable time period (e.g., the PUR Search Space window) for receiving the network response.

The Release 15 EDT (e.g., MO-EDT) may be initiated by uplink data originated from the UE (e.g., UE side-originated uplink data). In some embodiments, if there is downlink data available for the UE, the network may use paging to trigger the UE to initiate a RRC procedure, such as a RRC connection establishment procedure and/or a RRC connection resume procedure. The downlink data may be transmitted to the UE after the RRC connection is established, setup and/or resumed (e.g., the network may transmit the downlink data to the UE after a RA procedure, in which an RRC connection is established, setup and/or resumed, is successfully completed). In order to improve the efficiency for downlink data transmission that originates from the network (e.g., network side-originated downlink data transmission), MT-EDT may be introduced. In the following paragraphs, the term "EDT" may be different than MT-EDT and/or may correspond to MO-EDT and/or one or more other types of EDT that are not MT-EDT, unless otherwise specified.

There are at least two possible candidates for MT-EDT procedure. The MT-EDT procedure candidates use a RA procedure as a baseline, and the network may use a paging message (e.g., Msg0) to trigger the UE to initiate a MT-EDT procedure (e.g., the paging message may be indicative of MT-EDT).

A first candidate MT-EDT procedure is called Msg2-based MT-EDT. Acts of the first candidate MT-EDT procedure are outlined below. Details of one or more acts of the first candidate MT-EDT procedure may be further studied and/or researched, such as with respect to implementation.

In some embodiments, after the MT-EDT is initiated, the UE transmits a RA preamble on PRACH to the network (e.g., the UE transmits a Msg1 of a RA procedure, where the Msg1 is indicative of the RA preamble). The MT-EDT may be initiated in response to receiving the paging message indicative of MT-EDT. A dedicated preamble and/or a PRACH resource may be provided in the paging message (e.g., the paging message may be indicative of the dedicated preamble and/or the PRACH resource). The UE may use the dedicated preamble so that the network may identify the UE after receiving the Msg1. For example, the Msg1 and/or the RA preamble may be indicative of the dedicated preamble.

Accordingly, the network may identify the UE (and/or determine that the Msg1 and/or the RA preamble are associated with the UE) based on a determination that the Msg1 and/or the RA preamble are indicative of the dedicated preamble that the network provided to the UE in the paging message. In some embodiments, the RA preamble may be for EDT (e.g., the RA preamble may be for MO-EDT). Alternatively and/or additionally, the RA preamble may not be for EDT (e.g., the RA preamble may not be for MO-EDT). In some embodiments, the RA preamble may be for MT-EDT. Alternatively and/or additionally, the RA preamble may not be for MT-EDT.

In some embodiments, the UE monitors PDCCH during a RA Response window (and/or during a pre-defined time period). The UE may receive Msg2 of the RA procedure from the network (e.g., the Msg2 may comprise a RA Response). In some embodiments, the Msg2 is received during the RA Response window. In some embodiments, the Msg2 comprises downlink data from the network. In some embodiments, the Msg2 is addressed to a RA-RNTI. Alternatively and/or additionally, the Msg2 is addressed to a specific RNTI. Whether the Msg2 is addressed to the RA-RNTI or the specific RNTI is still under discussion. In some embodiments, the paging message is indicative of a RNTI (e.g., the RA-RNTI and/or the specific RNTI). Alternatively and/or additionally, the paging message is not indicative of the RNTI. Whether the RNTI is provided in the paging message is still under discussion. The Msg2 may comprise a RRC message. The RRC message may comprise the downlink data. In some embodiments, the downlink data may be encapsulated in the RRC message. Alternatively and/or additionally, the downlink data may be multiplexed with the RRC message. Alternatively and/or additionally, the Msg2 may not comprise the RRC message (and/or there may be no RRC message in the Msg2).

In some embodiments, the UE may transmit a third message to the network. In some embodiments, the third message may be transmitted such that the network can confirm that the UE successfully received the Msg2 and/or the downlink data. Alternatively and/or additionally, the third message may comprise uplink data transmitted by the UE in response to the downlink data. How the UE transmits the third message to the network is still under discussion. In some embodiments, an uplink grant may be provided in the Msg2 (e.g., the Msg2 may be indicative of the uplink grant). The UE may use the uplink grant provided in the Msg2 to transmit the third message (e.g., the UE may transmit the third message using one or more resources indicated by the uplink grant). In some embodiments, the third message may include first uplink data responsive to the downlink data received in the Msg2. Alternatively and/or additionally, the third message may include second uplink data that is not a response to the downlink data received in the Msg2 (e.g., the second uplink data may comprise information that is different than and/or separate from the downlink data).

A second candidate MT-EDT procedure is called Msg4-based MT-EDT. Acts of the second candidate MT-EDT procedure are outlined below. Details of one or more acts of the second candidate MT-EDT procedure may be further studied and/or researched, such as with respect to implementation.

In some embodiments, after the MT-EDT is initiated, the UE transmits a RA preamble on PRACH to the network (e.g., the UE transmits a Msg1 of a RA procedure, where the Msg1 is indicative of the RA preamble). The MT-EDT may be initiated in response to receiving the paging message indicative of MT-EDT. In the second candidate MT-EDT procedure, the paging message may comprise a dedicated preamble. Alternatively and/or additionally, in the second candidate MT-EDT procedure, the paging message may not comprise the dedicated preamble (and/or there may be no dedicated preamble in the paging message). In some embodiments, the RA preamble may be for EDT (e.g., the RA preamble may be for MO-EDT). Alternatively and/or additionally, the RA preamble may not be for EDT (e.g., the RA preamble may not be for MO-EDT). In some embodiments, the RA preamble may be for MT-EDT. Alternatively and/or additionally, the RA preamble may not be for MT-EDT.

In some embodiments, the UE monitors PDCCH during a RA Response window (and/or during a pre-defined time period). The UE may receive Msg2 of the RA procedure from the network (e.g., the Msg2 may comprise a RA Response). In some embodiments, the Msg2 is received during the RA Response window. In some embodiments, the Msg2 may comprise an uplink grant. In some embodiments, the uplink grant is a legacy uplink grant (e.g., an uplink grant that is not for EDT). Alternatively and/or additionally, the uplink grant may be an uplink grant for EDT (e.g., an uplink grant for MO-EDT). Alternatively and/or additionally, the uplink grant may be an uplink grant for MT-EDT.

In some embodiments, after receiving the Msg2, the UE transmits a Msg3 of the RA procedure to the network using the uplink grant provided in the Msg2 (e.g., the UE may transmit the Msg3 using one or more resources indicated by the uplink grant provided in the Msg2). In some embodiments, the Msg3 may comprise a RRC message. In some embodiments, if the UE has uplink data available for transmission to the network, the uplink data may be included in the Msg3 (e.g., the uplink data may not be a response to downlink data received via a Msg4 of the RA procedure). The RRC message may comprise the uplink data. In some embodiments, the uplink data may be encapsulated in the RRC message. Alternatively and/or additionally, the uplink data may be multiplexed with the RRC message. Alternatively and/or additionally, the Msg3 may not comprise the RRC message (and/or there may be no RRC message in the Msg3).

In some embodiments, the UE monitors PDCCH during the Contention Resolution Timer (e.g., the UE may monitor PDCCH while the Contention Resolution Timer is running). In some embodiments, the UE receives a Msg4 of the RA procedure from the network. In some embodiments, the Msg4 comprises downlink data provided by the network. The UE may receive the Msg4 while the Contention Resolution Timer is running. The Msg4 may comprise a RRC message. The RRC message may comprise the downlink data. In some embodiments, the downlink data may be encapsulated in the RRC message. Alternatively and/or additionally, the downlink data may be multiplexed with the RRC message. Alternatively and/or additionally, the Msg4 may not comprise the RRC message (and/or there may be no RRC message in the Msg4).

In some embodiments, the UE may transmit a fifth message to the network. In some embodiments, the fifth message may be transmitted such that the network can confirm that the UE successfully received the Msg4 and/or the downlink data. Alternatively and/or additionally, the fifth message may comprise uplink data transmitted by the UE in response to the downlink data. How the UE transmits the fifth message to the network is still under discussion. In some embodiments, an uplink grant may be provided in the Msg4 (e.g., the Msg4 may be indicative of the uplink grant). The UE may use the uplink grant provided in the Msg4 to transmit the fifth message (e.g., the UE may transmit the fifth message using one or more resources indicated by the uplink grant). In some embodiments, the fifth message may include first uplink data responding to the downlink data received in the Msg4. Alternatively and/or additionally, the fifth message may include second uplink data that is not a response to the downlink data received in the Msg4 (e.g., the second uplink data may comprise information that is different than and/or separate from the downlink data).

In some embodiments, the uplink data included in the Msg3 may be different than the uplink data included in the fifth message. Alternatively and/or additionally, the uplink data included in the Msg3 may be the same as the uplink data included in the fifth message.

In some embodiments, there may be at least two types of MT-EDT. A first type of MT-EDT may be control plane MT-EDT (CP-MT-EDT) and a second type of MT-EDT may be user plane MT-EDT (UP-MT-EDT). Details of CP-MT-EDT and UP-MT-EDT are still under discussion.

When the UE is in RRC_IDLE mode, if the UE receives a paging message indicative of MT-EDT, the UE may initiate a MT-EDT procedure. The MT-EDT procedure may be regarded as a special type of RA procedure. According to 3GPP TS 36.211 V15.5.0, when the UE performs RA preamble transmission, the UE assumes that there is no Timing Advance (e.g. the UE assumes that $N_{TA}=0$, where $N_{TA}$ corresponds to a Timing Advance value) and/or the UE does not use a maintained Timing Advance value (which may be non-zero) for RA preamble transmission. The UE may obtain a new Timing Advance in a Msg2 of the MT-EDT procedure. The UE may use the new Timing Advance for further uplink transmission. For example, the UE may use the new Timing Advance to transmit a Msg3 of the MT-EDT procedure to a network associated with the MT-EDT procedure. In an example where the UE is configured with PUR, the UE maintains a Timing Advance value during RRC_IDLE mode. When there is uplink data available for transmission to the network, the UE determines whether the Timing Advance value is valid or not based on some criteria configured by the network (e.g., the UE may determine whether the Timing Advance value is valid based on at least one of a Timing Advance Timer for PUR, one or more Serving Cell RSRP changes, etc.). If the Timing Advance is determined to be valid, the UE performs transmission using PUR with the maintained Timing Advance value (e.g., $N_{TA}$). If the Timing Advance is determined to not be valid, the UE may initiate a RA procedure (e.g., a RA procedure for EDT and/or a RA procedure that is not for EDT). Upon initiation of the RA procedure, the UE may release the PUR configuration and the network may then need to provide a PUR configuration again, resulting in additional signaling overhead.

It is possible that a UE configured with PUR receives a paging message indicative of MT-EDT. The UE may then initiate a RA procedure and/or a MT-EDT procedure and/or the UE may perform RA preamble transmission regardless of whether the UE has a valid Timing Advance or not. In addition, the transmission power of the RA preamble may start with a relatively small value (e.g., the transmission power of the RA preamble may increase as one or more transmissions of the RA preamble are performed). Accordingly, transmission of a Msg1 and/or a Msg3 of the RA procedure and/or the MT-EDT procedure may not succeed with a single attempt (e.g. one or more retransmissions of the Msg1 and/or the Msg3 may need to be performed during the RA procedure and/or the MT-EDT procedure). This may result in additional power consumption, signaling overhead and/or scheduling delay in performing the RA procedure and/or the MT-EDT procedure. In addition, the initiation of the RA procedure and/or the MT-EDT procedure may result in UE releasing the PUR configuration, and the network may then need to provide a PUR configuration again, resulting in additional signaling overhead.

Techniques are provided herein to solve the aforementioned issues. Embodiment 1 and embodiment 2 of the present disclosure may be implemented in scenarios in which a UE configured with one or more PURs (e.g., one or more dedicated PURs) receives a paging message indicative of MT-EDT.

Embodiment 1

In Embodiment 1, the UE may not release a PUR configuration (e.g., a dedicated PUR configuration) corresponding to the one or more PURs when initiating a RA procedure for MT-EDT (e.g., the RA procedure for MT-EDT may correspond to a MT-EDT procedure).

In some embodiments, in response to receiving the paging message indicative of MT-EDT, the UE does not release the PUR configuration when initiating a RA procedure for MT-EDT. For example, in response to receiving the paging message and/or determining that the paging message is indicative of MT-EDT, the UE may initiate a RA procedure for MT-EDT and/or the UE may not release the PUR configuration based on the determination that the paging message is indicative of MT-EDT.

In some embodiments, if the paging message does not indicate MT-EDT, the UE releases the PUR configuration when initiating a RA procedure not for MT-EDT. For example, in response to receiving the paging message and/or determining that the paging message is not indicative of MT-EDT, the UE may initiate a RA procedure that is not for MT-EDT and/or the UE may release the PUR configuration based on the determination that the paging message is not indicative of MT-EDT.

Alternatively and/or additionally, the paging message indicative of MT-EDT may be indicative of whether the UE should release the PUR configuration. In some embodiments, the UE releases the PUR configuration in response to a determination that the paging message indicates (and/or instructs) release of the PUR configuration. In some embodiments, the UE does not release the PUR configuration in response to a determination that the paging message does not indicate (and/or does not instruct) release of the PUR configuration.

Embodiment 2

In Embodiment 2, the UE may determine whether a Timing Advance (e.g., a Timing Advance for PUR) is valid in response to receiving the paging message indicative of MT-EDT.

In some embodiments, the UE may determine that the Timing Advance is valid. Based on the determination that the Timing Advance is valid, the UE may not initiate a RA procedure for MT-EDT in response to receiving the paging message indicative of MT-EDT.

In some embodiments, the UE may determine that the Timing Advance is not valid. Based on the determination that the Timing Advance is not valid, the UE may initiate a RA procedure for MT-EDT in response to receiving the paging message indicative of MT-EDT.

In some embodiments, the UE may determine whether the Timing Advance is valid based on Timing Advance validation criteria. In some embodiments, the Timing Advance validation criteria is configured by the network. In some embodiments, the Timing Advance validation criteria may be associated with a Timing Advance timer for PUR. In some embodiments, the Timing Advance validation criteria may comprise the Timing Advance timer, whether the Timing Advance timer for PUR is running and/or other criteria. In an example, the UE may determine that the Timing Advance is not valid based on a determination that the Timing Advance timer for PUR is not running (and/or based on other criteria of the Timing Advance validation criteria). Alternatively and/or additionally, the UE may determine that the Timing Advance is valid based on a determination that the Timing Advance timer for PUR is running (and/or based on other criteria of the Timing Advance validation criteria).

Alternatively and/or additionally, in an example where the UE determines that the Timing Advance is valid, the UE may determine a duration of time before a PUR occasion (e.g., an upcoming PUR occasion and/or a next available PUR occasion for the UE). In some embodiments, the duration of time may correspond to a duration of time between reception of the paging message and the PUR occasion. For example, the duration of time may correspond to a duration of time between a first subframe T1 within which the paging message is received and a second subframe T2 associated with the PUR occasion (e.g., the PUR occasion may be scheduled for the second subframe T2). In some embodiments, the duration of time is in units of at least one of frames, subframes, slots, seconds, milliseconds, microseconds etc. In some embodiments, the duration of time may correspond to a difference in subframes between the first subframe T1 and the second subframe T2 (e.g., the duration of time may correspond to T2-T1). Alternatively and/or additionally, the duration of time may correspond to a difference in time between a time of the first subframe T1 and a time of the second subframe T2. In some embodiments, the duration of time is compared with a threshold. In response to determining that the duration of time is greater than the threshold, the UE may initiate a RA procedure for MT-EDT. In response to determining that the duration of time is smaller than (and/or is not greater than) the threshold, the UE may not initiate a RA procedure for MT-EDT. In some embodiments, the threshold may be pre-defined (e.g., the threshold may be pre-defined as 10 subframes, one millisecond, etc.). In some embodiments, the threshold may be configurable (e.g., the threshold is configured in the PUR configuration or MT-EDT configuration).

Figure 14:
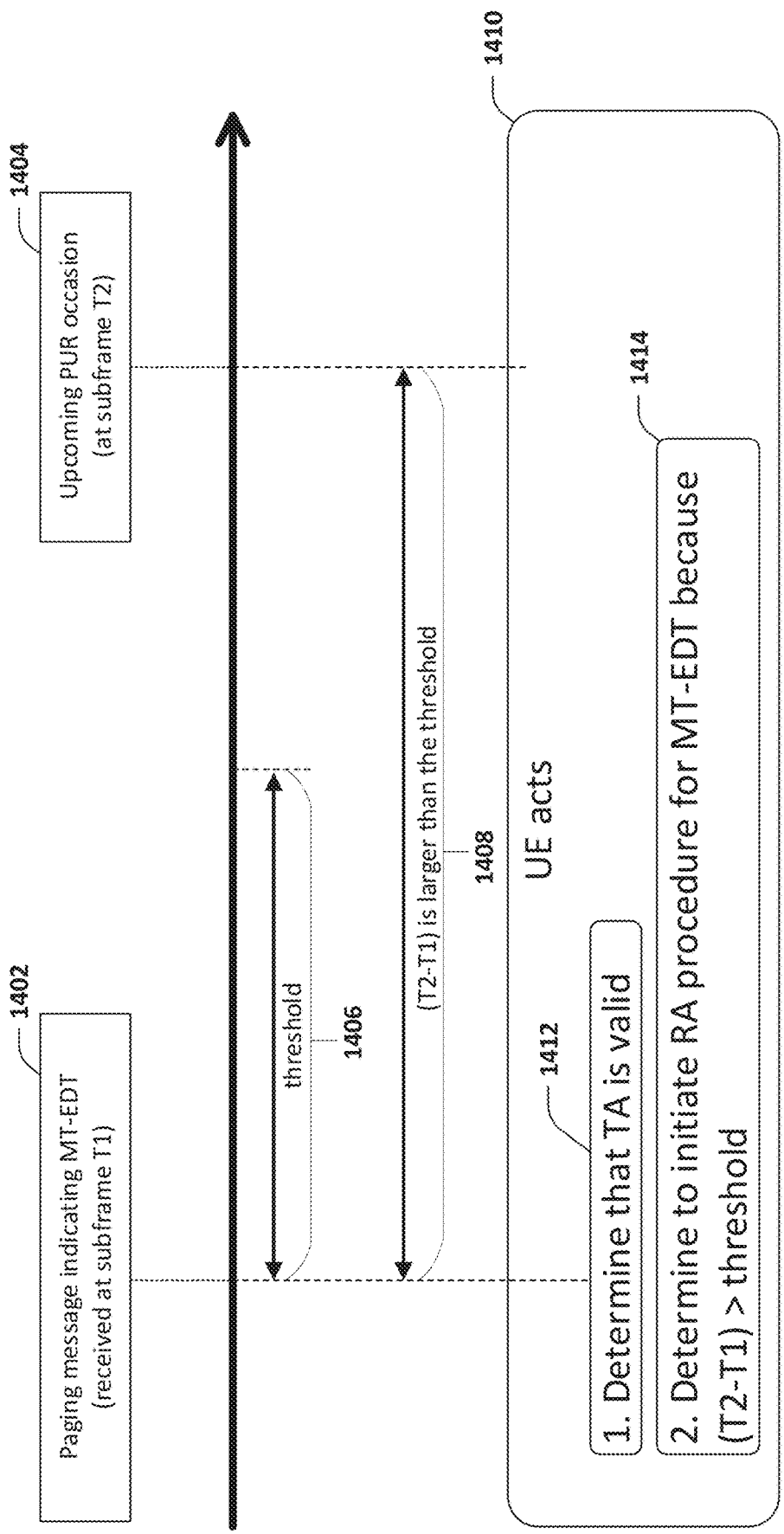
FIG. 14 is a diagram illustrating an exemplary scenario in which a UE determines a duration of time associated with a preconfigured uplink resource (PUR) occasion according to one exemplary embodiment.

FIG. 14 illustrates an exemplary scenario in which the UE determines a duration of time 1408 associated with a PUR occasion 1404 (e.g., an upcoming PUR occasion and/or a next available PUR occasion for the UE). In some embodiments, the UE receives a paging message 1402 indicative of MT-EDT at a first subframe T1. In response to receiving the paging message 1402, the UE may perform one or more UE acts 1410. The one or more UE acts 1410 may comprise an act 1412 of determining whether a Timing Advance associated with the UE is valid. The one or more UE acts 1410 may comprise an act 1414 of determining whether to initiate a RA procedure for MT-EDT based on the duration of time 1408. In some embodiments, the duration of time 1408 corresponds to a difference in subframes between the first subframe T1 and a second subframe T2 associated with the PUR occasion 1404 (e.g., the duration of time 1408 may correspond to T2-T1). Alternatively and/or additionally, the duration of time 1408 may correspond to a difference in time between a time of the first subframe T1 and a time of the second subframe T2. In some embodiments, the duration of time 408 may be compared with a threshold 1406. The UE may determine to initiate a RA procedure and/or initiate the RA procedure for MT-EDT based on a determination that the Timing Advance is not valid. The UE may determine to initiate a RA procedure and/or initiate the RA procedure for MT-EDT based on a determination that the duration of time 1408 is greater than the threshold 1406 if the UE determines that the Timing Advance is valid.

Alternatively and/or additionally, the paging message indicative of MT-EDT may be indicative of whether the UE should initiate a RA procedure for MT-EDT. In some embodiments, the UE determines to initiate a RA procedure for MT-EDT (and/or the UE initiates the RA procedure for MT-EDT) responsive to a determination that the paging message indicates (and/or instructs) the UE to initiate a RA procedure for MT-EDT. In some embodiments, the UE determines not to initiate a RA procedure for MT-EDT (and/or the UE does not initiate a RA procedure for MT-EDT) responsive to a determination that the paging message does not indicate (and/or does not instruct) the UE to initiate a RA procedure for MT-EDT.

Embodiment 3 and embodiment 4 of the present disclosure may be implemented in scenarios in which the UE does not initiate a RA procedure for MT-EDT, such as where the UE does not initiate a RA procedure for MT-EDT based on one or more actions performed in accordance with Embodiment 1 and/or Embodiment 2.

Embodiment 3

In Embodiment 3, the UE performs a PUR transmission (e.g., a transmission of data to a network via one or more PURs) on a PUR occasion (e.g., an upcoming PUR occasion and/or a next available PUR occasion for the UE).

In some embodiments, after the UE performs the PUR transmission, the UE monitors PDCCH during a configurable time period (e.g., a PUR Search Space window). The configurable time period may be determined based on a PUR configuration, such as a dedicated PUR configuration, associated with the UE, such as described in the foregoing description. The UE may receive a network response associated with the transmission during the configurable time period. The network response for PUR may comprise downlink data and/or a RRC message, such as described in the foregoing description.

In an example, the PUR occasion is at a first subframe T2. The configurable time period (e.g., the PUR Search Space window) may start at a second subframe (T2+start_offset) and/or the configurable time period may end at a third subframe (T2+start_offset+window_length−1). The UE may perform the PUR transmission at the first subframe T2, and the UE may start monitoring the PDCCH at the second subframe (T2+start_offset) and/or continue monitoring the PDCCH until the third subframe (T2+start_offset+window_length−1). In some embodiments, in response to receiving the network response during the configurable time period, the UE may stop monitoring the PDCCH. Alternatively and/or additionally, in response to receiving the network response during the configurable time period, the UE may continue monitoring the PDCCH until the third subframe (T2+start_offset+window_length−1).

Figure 15:
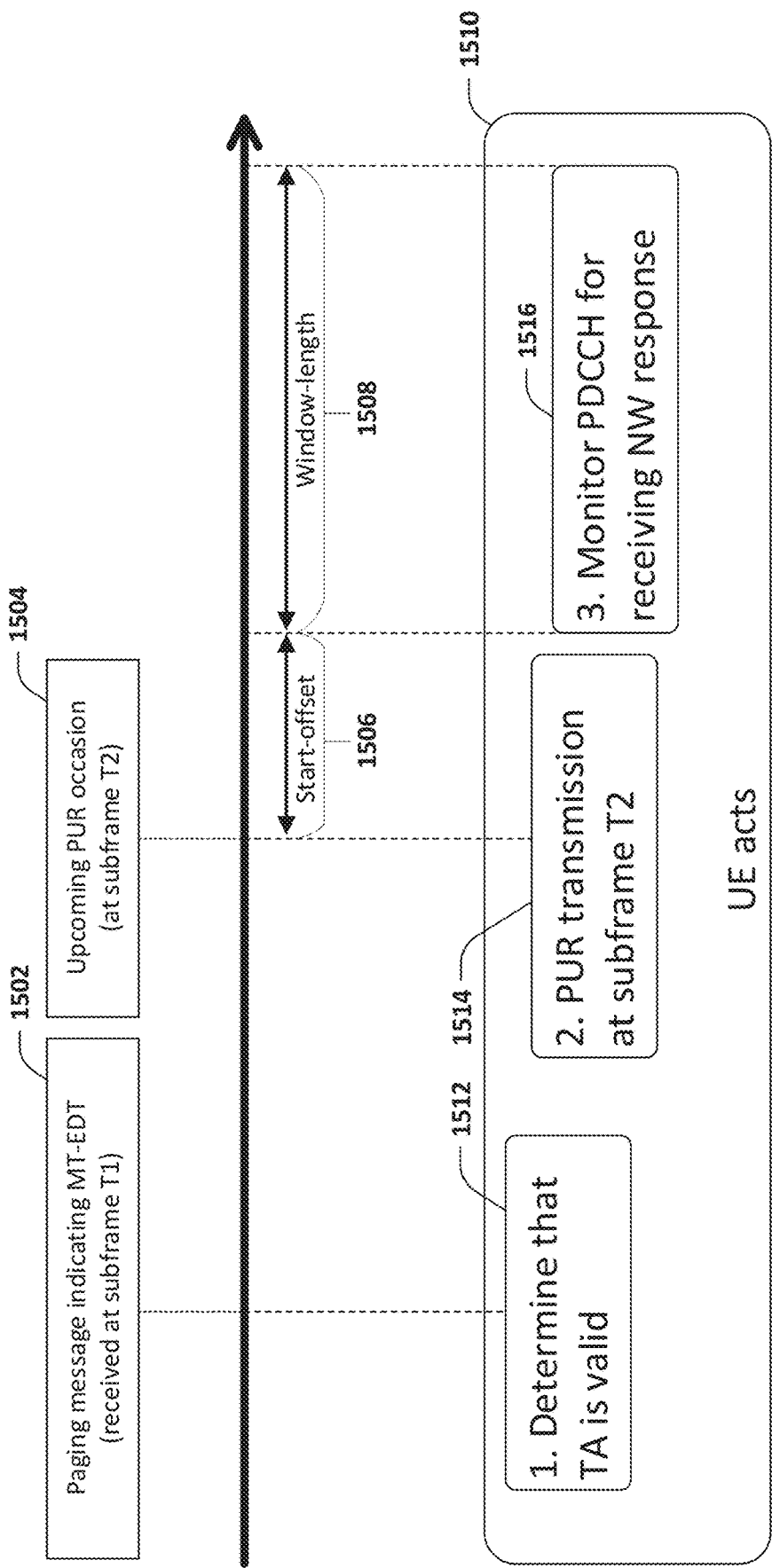
FIG. 15 is a diagram illustrating an exemplary scenario in which a UE monitors Physical Downlink Control Channel (PDCCH) during a configurable time period according to one exemplary embodiment.

FIG. 15 illustrates an exemplary scenario in which the UE monitors PDCCH during a configurable time period 1508 (e.g., a PUR Search Space window). In some embodiments, the UE receives a paging message 1502 indicative of MT-EDT at a first subframe T1. In response to receiving the paging message 1502, the UE may perform one or more UE acts 1510. The one or more UE acts 1510 may comprise an act 1512 of determining whether a Timing Advance associated with the UE is valid. The one or more UE acts 1510 may comprise an act 1514 of performing a PUR transmission on a PUR occasion 1504 (e.g., an upcoming PUR occasion and/or a next available PUR occasion for the UE). In some embodiments, the PUR transmission may be performed based on a determination that the Timing Advance is valid. In some embodiments, the one or more UE acts 1510 may comprise an act 1516 of monitoring the PDCCH during the configurable time period 1508 to receive a network response (in response to the PUR transmission). In some embodiments, the configurable time period 1508 may be determined based on an offset 1506, a second subframe T2 of the PUR occasion and/or a window length of the configurable time period 1508. For example, the configurable time period 1508 may start at a third subframe (e.g., the second subframe T2+the offset 1506) and end at a fourth subframe (e.g., the second subframe T2+the offset 1506+the window length−1). In some embodiments, in response to receiving the network response during the configurable time period 1508, the UE may stop monitoring the PDCCH. Alternatively and/or additionally, in response to receiving the network response during the configurable time period 1508, the UE may continue monitoring the PDCCH until the fourth subframe.

In some embodiments, the start_offset may be equal to zero (e.g., at least one of zero subframes, zero seconds, etc.). In some embodiments, the start_offset may be a positive value (e.g., the configurable time period may start after the PUR occasion). In some embodiments, the start_offset may be a negative value (e.g., the configurable time period may start before the PUR occasion). In some embodiments, the start_offset may be pre-defined. In some embodiments, the start_offset may be configured in the PUR configuration and/or in a PUR search space configuration configured in the PUR configuration. The window_length may be a duration (and/or a length) of the configurable time period (e.g., the PUR Search Space window). The window_length may be configured in the PUR configuration and/or in the PUR search space configuration.

In some embodiments, the PUR occasion may be a next available PUR occasion. The PUR occasion may be the closest PUR occasion in time after the UE receives the paging message indicative of MT-EDT (e.g. an initial PUR occasion after receiving the paging message). For example, there may be no other PUR occasion associated with the UE between a time that the UE receives the paging message and a time of the PUR occasion.

The UE may monitor the PDCCH based on the PUR search space configuration configured in the PUR configuration.

In some embodiments, the PUR transmission may comprise transmission of a RRC message (e.g., the RRC message may be included in the PUR transmission). In some embodiments, the RRC message may be an RRCEarlyDataRequest message. Alternatively and/or additionally, the RRC message may be an RRCConnectionResumeRequest message. Alternatively and/or additionally, the RRC message may be a new RRC message designed for MT-EDT, such as an RRCEarlyDLDataRequest message. In some embodiments where the UE has uplink data available for transmission, the PUR transmission may comprise transmission of the uplink data (e.g., the uplink data may be included in the PUR transmission). In some embodiments, the uplink data may not be a response to the network response and/or the downlink data in the network response. For example, the uplink data may comprise information that is different than and/or separate from the network response and/or the downlink data in the network response. In some embodiments, the RRC message may comprise the uplink data. In some embodiments, the uplink data may be encapsulated in the RRC message. Alternatively and/or additionally, the uplink data may be multiplexed with the RRC message. In some embodiments, the PUR transmission may not comprise transmission of the RRC message (and/or there may be no RRC message in the PUR transmission).

In some embodiments, the network response may comprise a RRC message. In some embodiments, the RRC message may be an RRCEarlyDataComplete message. Alternatively and/or additionally, the RRC message may be an RRCConnectionResume message. Alternatively and/or additionally, the RRC message may be an RRCConnectionRelease message. Alternatively and/or additionally, the RRC message may be an RRCConnectionSetup message. Alternatively and/or additionally, the RRC message may be a new RRC message designed for MT-EDT, such as an RRCEarlyDLDataComplete message. In some embodiments, the RRC message may comprise the downlink data. In some embodiments, the downlink data may be encapsulated in the RRC message. Alternatively and/or additionally, the downlink data may be multiplexed with the RRC message. In some embodiments, the network response may not comprise the RRC message (and/or there may be no RRC message in the network response).

In an example where uplink data responsive to the network response and/or the downlink data (of the network response) is available (and/or where the UE is indicated and/or instructed to transmit the uplink data in response to the network response and/or the downlink data), the UE may transmit the uplink data using an uplink grant provided in the network response. For example, the UE may transmit the uplink data using one or more resources indicated by the uplink grant in the network response. Alternatively and/or additionally, the UE may transmit the uplink data using a next PUR occasion (e.g., an upcoming PUR occasion and/or a next available PUR occasion for the UE after receiving the network response). Alternatively and/or additionally, the UE may initiate a RA procedure for EDT (e.g., a RA procedure for MO-EDT) to transmit the uplink data (e.g., the UE may transmit the uplink data in the RA procedure). Alternatively and/or additionally, the UE may initiate a RA procedure not for EDT (e.g., a RA procedure not for MO-EDT) to transmit the uplink data (e.g., the UE may transmit the uplink data in the RA procedure).

In some embodiments, if the network response is not received during the configurable time period (and/or no network response is received during the configurable time period), the UE may initiate a RA procedure for MT-EDT. Alternatively and/or additionally, if the network response is not received during the configurable time period (and/or no network response is received during the configurable time period), the UE may initiate a RA procedure for EDT (e.g., a RA procedure for MO-EDT). Alternatively and/or additionally, if the network response is not received during the configurable time period (and/or no network response is received during the configurable time period), the UE may initiate a RA procedure, where the RA procedure is neither for MT-EDT nor for EDT.

In Embodiment 3, in examples where there is repetition of a transmission, such as an uplink transmission (e.g., the uplink data) and/or a downlink transmission (e.g., the paging message), a subframe timing associated with the transmission described with respect to Embodiment 3 (e.g., the subframe timing may correspond to subframe T1 associated with reception of the paging message and/or subframe T2 associated with the PUR transmission) may correspond to a subframe associated with a first repetition of the transmission or a last repetition of the transmission. In some embodiments, the subframe T1 associated with reception of the paging message corresponds to a last repetition of transmission of the paging message by the network to the UE (e.g., a last repetition of transmission of the paging message by the network to the UE may be performed on the subframe T1). In some embodiments, the subframe T2 associated with the PUR transmission corresponds to a first repetition of the PUR transmission (e.g., the first repetition of the PUR transmission by the UE to the network may be performed on the subframe T2).

Embodiment 4

In Embodiment 4, the UE does not perform a PUR transmission on a PUR occasion (e.g., an upcoming PUR occasion and/or a next available PUR occasion for the UE).

In some embodiments, the UE monitors PDCCH during a configurable time period (e.g. a PUR Search Space window) without performing the PUR transmission on the PUR occasion. In an example, the PUR occasion may be at a first subframe T2 and the configurable time period may start from a second subframe (T2+start_offset) and/or may end at a third subframe (T2+start_offset+window_length−1). The UE may not perform the PUR transmission at the first subframe T2 (e.g., the PUR occasion), and the UE may start monitoring the PDCCH at the second subframe (T2+start_offset) and/or continue monitoring the PDCCH until the third subframe (T2+start_offset+window_length−1). In some embodiments, in response to receiving a network response during the configurable time period, the UE may stop monitoring the PDCCH. Alternatively and/or additionally, in response to receiving the network response during the configurable time period, the UE may continue monitoring the PDCCH until the third subframe (T2+start_offset+window_length−1).

Figure 16:
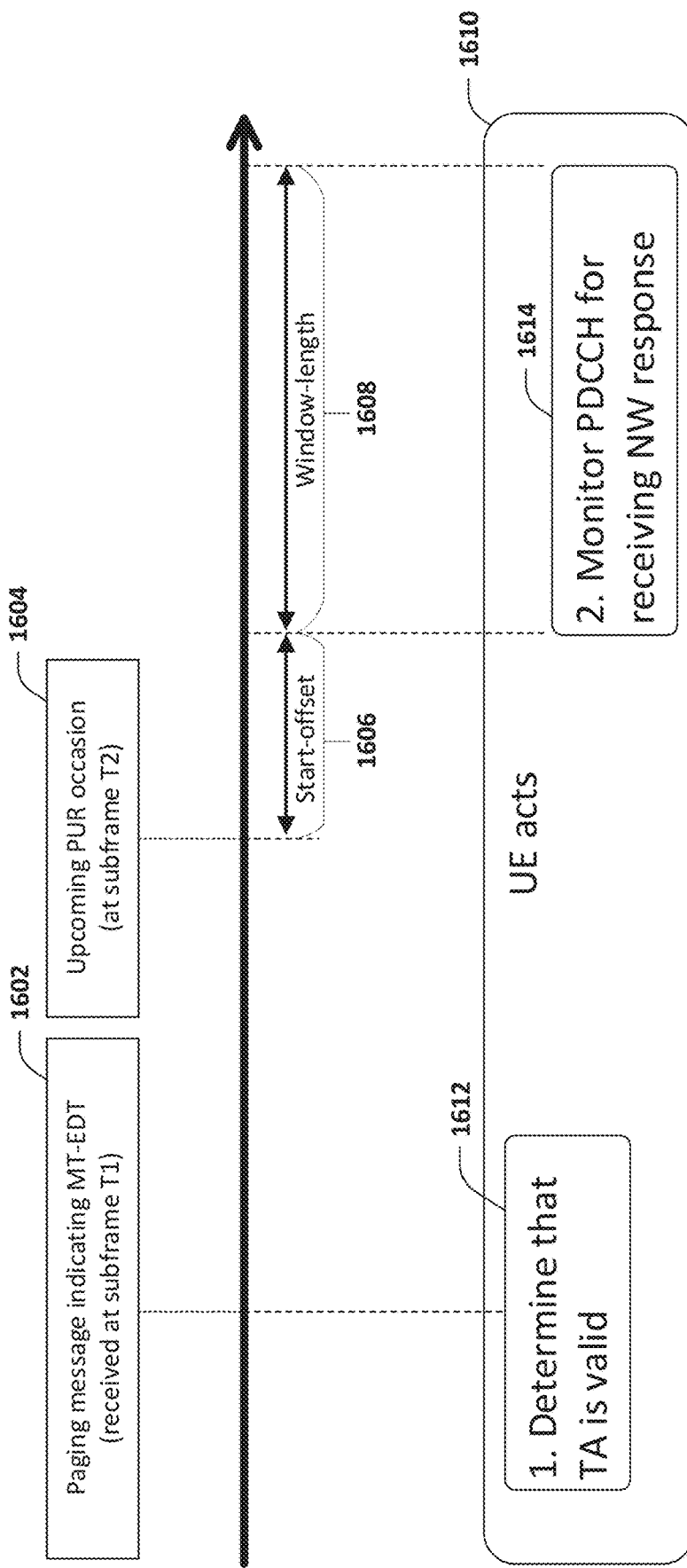
FIG. 16 is a diagram illustrating an exemplary scenario in which a UE monitors PDCCH during a configurable time period according to one exemplary embodiment.

FIG. 16 illustrates an exemplary scenario in which the UE monitors PDCCH during a configurable time period 1608 (e.g., a PUR Search Space window). In some embodiments, the UE receives a paging message 1602 indicative of MT-EDT at a first subframe T1. In response to receiving the paging message 1602, the UE may perform one or more UE acts 1610. The one or more UE acts 1610 may comprise an act 1612 of determining whether a Timing Advance associated with the UE is valid. In some embodiments, the one or more UE acts 1610 may comprise an act 1614 of monitoring the PDCCH during the configurable time period 1608 to receive a network response. In some embodiments, monitoring the PDCCH during the configurable time period 1608 may be performed based on a determination that the Timing Advance is valid. Alternatively and/or additionally, monitoring the PDCCH during the configurable time period 1608 may be performed regardless of whether the Timing Advance is valid. In some embodiments, the configurable time period 1608 may be determined based on an offset 1606, a second subframe T2 of a PUR occasion 1604 e.g., an upcoming PUR occasion and/or a next available PUR occasion for the UE) and/or a window length of the configurable time period 1608. For example, the configurable time period 1608 may start at a third subframe (e.g., the second subframe T2+the offset 1606) and end at a fourth subframe (e.g., the second subframe T2+the offset 1606+the window length−1). In some embodiments, in response to receiving the network response during the configurable time period 1608, the UE may stop monitoring the PDCCH. Alternatively and/or additionally, in response to receiving the network response during the configurable time period 1608, the UE may continue monitoring the PDCCH until the fourth subframe.

Alternatively and/or additionally, the UE may start to monitor PDCCH after reception of the paging message indicative of MT-EDT and/or before the upcoming PUR occasion. In an example, the UE may receive the paging message at a first subframe T1. The configurable time period (e.g., the PUR Search Space window) within which the UE monitors the PDCCH may start at a second subframe (T1+start_offset) and/or may end at a third subframe (T1+start_offset+window_length−1). For example, the UE may start monitoring the PDCCH at the second subframe (T1+start_offset) and/or continue monitoring the PDCCH until the third subframe (T1+start_offset+window_length−1). In some embodiments, in response to receiving a network response during the configurable time period, the UE may stop monitoring the PDCCH. Alternatively and/or additionally, in response to receiving the network response during the configurable time period, the UE may continue monitoring the PDCCH until the third subframe (T1+start_offset+window_length−1).

Figure 17:
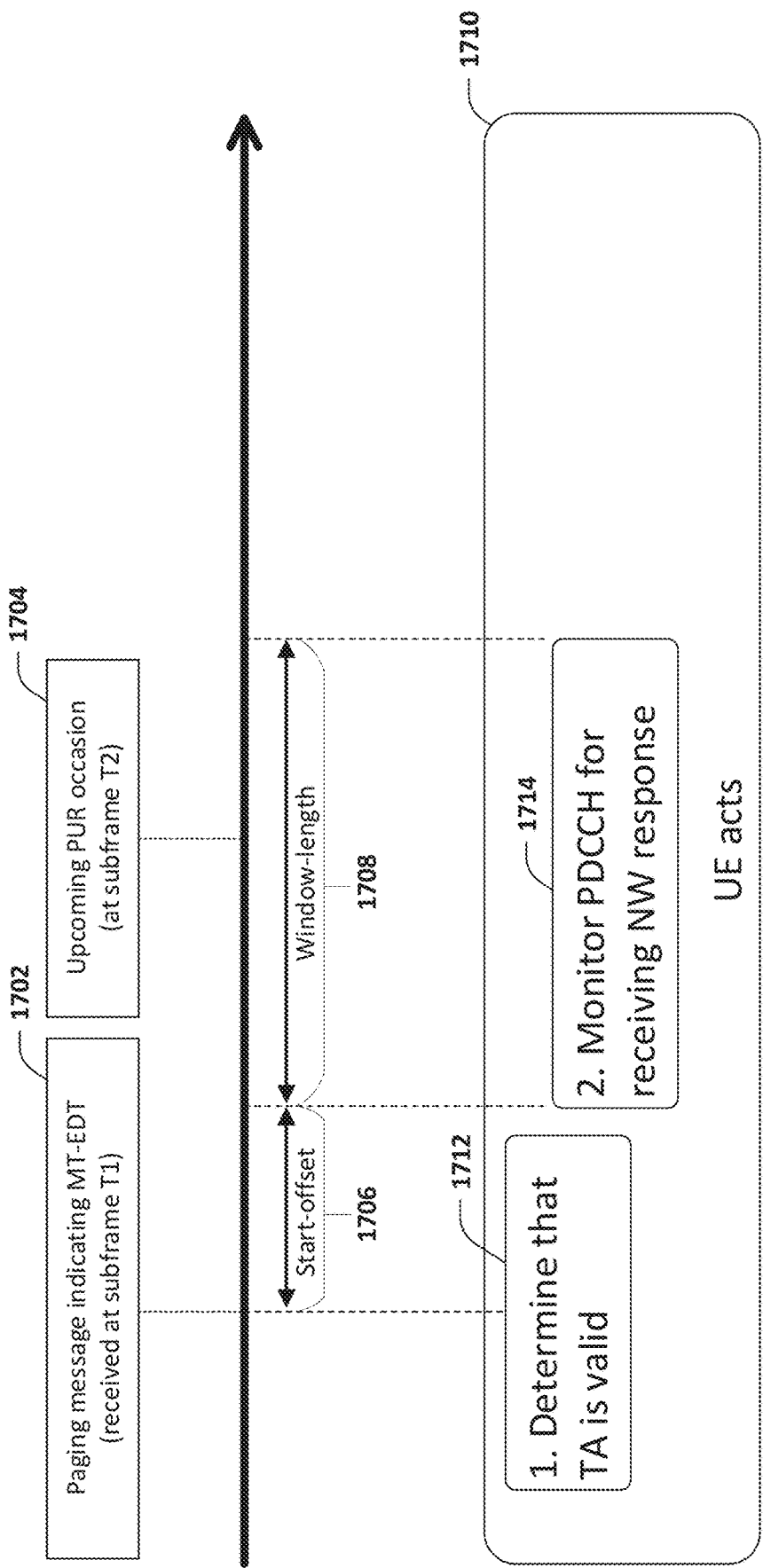
FIG. 17 is a diagram illustrating an exemplary scenario in which a UE monitors PDCCH during a configurable time period according to one exemplary embodiment.

FIG. 17 illustrates an exemplary scenario in which the UE monitors PDCCH during a configurable time period 1708 (e.g., a PUR Search Space window). In some embodiments, the UE receives a paging message 1702 indicative of MT-EDT at a first subframe T1. In response to receiving the paging message 1702, the UE may perform one or more UE acts 1710. The one or more UE acts 1710 may comprise an act 1712 of determining whether a Timing Advance associated with the UE is valid. In some embodiments, the one or more UE acts 1710 may comprise an act 1714 of monitoring the PDCCH during the configurable time period 1708 to receive a network response. In some embodiments, monitoring the PDCCH during the configurable time period 1708 may be performed based on a determination that the Timing Advance is valid. Alternatively and/or additionally, monitoring the PDCCH during the configurable time period 1708 may be performed regardless of whether the Timing Advance is valid. In some embodiments, the configurable time period 1708 may be determined based on an offset 1706, the first subframe T1 and/or a window length of the configurable time period 1708. In some embodiments, the configurable time period 1708 may start before a PUR occasion 1704 (e.g., an upcoming PUR occasion and/or a next available PUR occasion for the UE). For example, the configurable time period 1708 may start at a third subframe (e.g., the first subframe T1+the offset 1706) and end at a fourth subframe (e.g., the first subframe T1+the offset 1706+the window length−1). In some embodiments, in response to receiving the network response during the configurable time period 1708, the UE may stop monitoring the PDCCH. Alternatively and/or additionally, in response to receiving the network response during the configurable time period 1708, the UE may continue monitoring the PDCCH until the fourth subframe.

In some embodiments, the start_offset may be equal to zero (e.g., at least one of zero subframes, zero seconds, etc.). In some embodiments, the start_offset may be a positive value (e.g., the configurable time period may start after receiving the paging message). In some embodiments, the start_offset may be a negative value (e.g., the configurable time period may start before receiving the paging message). In some embodiments, the start_offset may be pre-defined. In some embodiments, the start_offset may be configured in the PUR configuration and/or in a PUR search space configuration configured in the PUR configuration. The window_length may be a duration (and/or a length) of the configurable time period (e.g., the PUR Search Space window). The window_length may be configured in the PUR configuration and/or in the PUR search space configuration.

In some embodiments, the PUR occasion may be a next available PUR occasion. The PUR occasion may be the closest PUR occasion in time after the UE receives the paging message indicative of MT-EDT (e.g. an initial PUR occasion after receiving the paging message). For example, there may be no other PUR occasion associated with the UE between a time that the UE receives the paging message and a time of the PUR occasion.

In some embodiments, the UE may receive the network response during the configurable time period. The network response may comprise downlink data. The UE may monitor the PDCCH based on the PUR search space configuration configured in the PUR configuration. In some embodiments, the UE may receive the network response via the PDCCH and/or the UE may receive the network response while the UE monitors the PDCCH during the configurable time period.

In some embodiments, the network response may comprise a RRC message. In some embodiments, the RRC message may be an RRCEarlyDataComplete message. Alternatively and/or additionally, the RRC message may be an RRCConnectionResume message. Alternatively and/or additionally, the RRC message may be an RRCConnectionRelease message. Alternatively and/or additionally, the RRC message may be an RRCConnectionSetup message. Alternatively and/or additionally, the RRC message may be a new RRC message designed for MT-EDT, such as an RRCEarlyDLDataComplete message. In some embodiments, the RRC message may comprise the downlink data. In some embodiments, the downlink data may be encapsulated in the RRC message. Alternatively and/or additionally, the downlink data may be multiplexed with the RRC message. In some embodiments, the network response may not comprise the RRC message (and/or there may be no RRC message in the network response).

In an example where uplink data responsive to the network response and/or the downlink data (of the network response) is available (and/or where the UE is indicated and/or instructed to transmit the uplink data in response to the network response and/or the downlink data), the UE may transmit the uplink data using an uplink grant provided in the network response. For example, the UE may transmit the uplink data using one or more resources indicated by the uplink grant in the network response. Alternatively and/or additionally, the UE may transmit the uplink data using a next PUR occasion (e.g., an upcoming PUR occasion and/or a next available PUR occasion for the UE after receiving the network response). Alternatively and/or additionally, the UE may initiate a RA procedure for EDT (e.g., a RA procedure for MO-EDT) to transmit the uplink data (e.g., the UE may transmit the uplink data in the RA procedure). Alternatively and/or additionally, the UE may initiate a RA procedure not for EDT (e.g., a RA procedure not for MO-EDT) to transmit the uplink data (e.g., the UE may transmit the uplink data in the RA procedure).

In some embodiments, if the network response is not received during the configurable time period (and/or no network response is received during the configurable time period), the UE may initiate a RA procedure for MT-EDT. Alternatively and/or additionally, if the network response is not received during the configurable time period (and/or no network response is received during the configurable time period), the UE may initiate a RA procedure for EDT (e.g., a RA procedure for MO-EDT). Alternatively and/or additionally, if the network response is not received during the configurable time period (and/or no network response is received during the configurable time period), the UE may initiate a RA procedure, where the RA procedure is neither for MT-EDT nor for EDT.

In Embodiment 4, in examples where there is repetition of a transmission, such as an uplink transmission (e.g., the uplink data) and/or a downlink transmission (e.g., the paging message), a subframe timing associated with the transmission described with respect to Embodiment 4 (e.g., the subframe timing may correspond to subframe T1 associated with reception of the paging message and/or subframe T2 associated with transmission of the uplink data in an embodiment where the uplink data is transmitted via the PUR occasion) may correspond to a subframe associated with a first repetition of the transmission or a last repetition of the transmission. In some embodiments, the subframe T1 associated with reception of the paging message corresponds to a last repetition of transmission of the paging message by the network to the UE (e.g., a last repetition of transmission of the paging message by the network to the UE may be performed on the subframe T1). In an embodiment where the uplink data is transmitted via the PUR occasion, the subframe T2 associated with the uplink data may correspond to a first repetition of transmission of the uplink data (e.g., the first repetition of transmission of the uplink data by the UE to the network may be performed on the subframe T2).

One, some and/or all of the foregoing techniques and/or embodiments can be formed to a new embodiment.

In some examples, embodiments disclosed herein, such as embodiments described with respect to Embodiment 1, Embodiment 2, Embodiment 3 and Embodiment 4, may be implemented independently and/or separately. Alternatively and/or additionally, a combination of two or more of the embodiments disclosed herein, such as embodiments described with respect to Embodiment 1, Embodiment 2, Embodiment 3 and/or Embodiment 4, may be implemented. Alternatively and/or additionally, a combination of two or more of the embodiments disclosed herein, such as embodiments described with respect to Embodiment 1, Embodiment 2, Embodiment 3 and/or Embodiment 4, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

The UE may determine to implement at least one of Embodiment 3 or Embodiment 4 based on whether there is uplink data available for transmission upon reception of the paging message indicative MT-EDT. For example, if there is uplink data available for transmission upon reception of the paging message indicative of MT-EDT, the UE may perform a PUR transmission comprising the uplink data and/or the UE may monitor PDCCH for receiving a network response comprising downlink data, such as in accordance with Embodiment 3. Alternatively and/or additionally, if there is no uplink data available for transmission upon reception of the paging message indicative of MT-EDT, the UE may not perform a PUR transmission and/or the UE may monitor PDCCH for receiving a network response comprising downlink data without performing the PUR transmission, such as in accordance with Embodiment 4.

Various techniques of Embodiment 1 and Embodiment 2 may be combined. In an example where the UE is performing one or more actions in accordance with Embodiment 2, in response to the UE determining to initiate a RA procedure for MT-EDT, the UE may not release the PUR configuration (e.g., the dedicated PUR configuration), such as in accordance with Embodiment 1.

One, some and/or all of the foregoing techniques and/or embodiments described with respect to Embodiment 1, Embodiment 2, Embodiment 3 and/or Embodiment 4 may be applicable to MTC UEs, NB-IoT UEs and/or other types of UEs. One, some and/or all of the foregoing techniques and/or actions described with respect to Embodiment 1, Embodiment 2, Embodiment 3 and/or Embodiment 4 may be implemented and/or performed by MTC UEs, NB-IoT UEs and/or other types of UEs.

Figure 18:
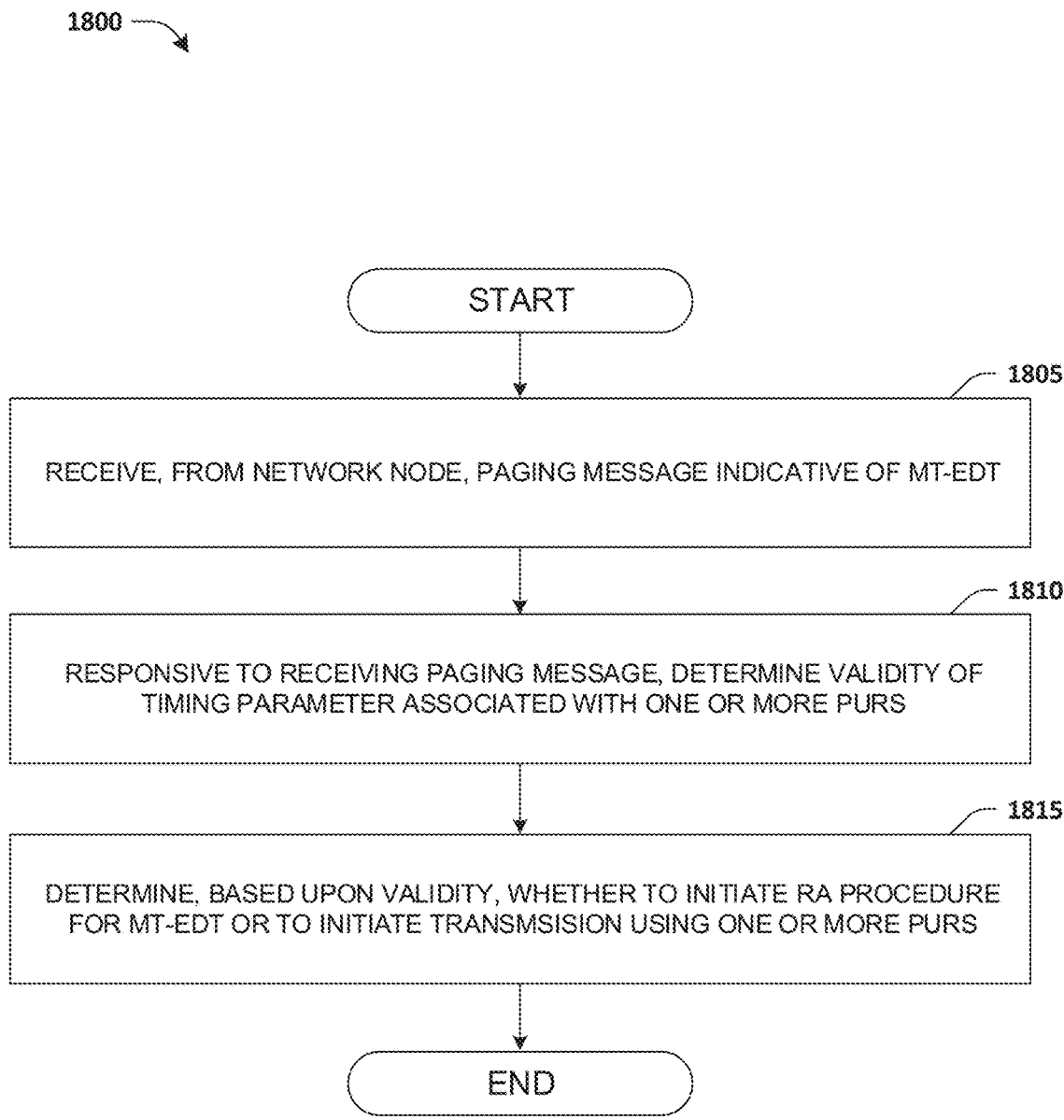
FIG. 18 is a flow chart according to one exemplary embodiment.

FIG. 18 is a flow chart 1800 according to one exemplary embodiment from the perspective of a UE. In step 1805, the UE receives, from a network node, a paging message indicative of MT-EDT. In step 1810, in response to receiving the paging message, the UE determines a validity of a timing parameter associated with one or more PURs. In step 1815, the UE determines, based on the validity, whether to initiate a RA procedure for MT-EDT or to initiate a transmission using the one or more PURs.

In one embodiment, the determination of the validity of the timing parameter comprises a determination that the timing parameter is not valid.

In one embodiment, the UE initiates the RA procedure for MT-EDT based on the determination that the timing parameter is not valid. In one embodiment, the UE transmits an uplink message to the network node during the RA procedure for MT-EDT.

In one embodiment, the determination of the validity of the timing parameter comprises a determination that the timing parameter is valid.

In one embodiment, the UE transmits, based on the determination that the timing parameter is valid, a first uplink message using the one or more PURs to the network node. In one embodiment, the UE monitors PDCCH during a time period. In one embodiment, the UE receives, from the network node, a first downlink message during the time period. For example, the UE may receive the first downlink message via the PDCCH and/or the UE may receive the first downlink message while the UE monitors the PDCCH during the time period.

In one embodiment, in response to receiving the first downlink message, the UE transmits, to the network node, a second uplink message, wherein the second uplink message comprises uplink data responsive to downlink data comprised in the first downlink message. For example, the uplink data in the second uplink message may be a response to the downlink data in the first downlink message.

In one embodiment, prior to receiving the paging message, the UE receives, from the network node, a first PUR configuration associated with the one or more PURs.

In one embodiment, the timing parameter is a Timing Advance or a Timing Adjustment. In one embodiment, the determination of the validity of the timing parameter is performed based on validation criteria in the first PUR configuration. The validation criteria may be associated with the timing parameter. For example, the validation criteria may be Timing Advance validation criteria. Alternatively and/or additionally, the validation criteria may be Timing Adjustment validation criteria.

In one embodiment, the validation criteria comprises a timer associated with the one or more PURs. For example, the timer may be a Timing Advance timer. Alternatively and/or additionally, the timer may be a Timing Adjustment timer. Alternatively and/or additionally, the timer may be a Time Alignment timer. In one embodiment, the determination of the validity of the timing parameter comprises determining that the timing parameter is valid based on a determination that the timer is running. In one embodiment, the determination of the validity of the timing parameter comprises determining that the timing parameter is not valid based on a determination that the timer is not running.

In one embodiment, the PDCCH is monitored based on the first PUR configuration.

In one embodiment, the time period is a PUR search space window and/or a time length of the time period is configured in the first PUR configuration.

In one embodiment, the transmission of the first uplink message is performed on a first PUR occasion and/or the first PUR occasion is a next available PUR occasion when the paging message is received. For example, there may be no other PUR occasion associated with the UE between a time that the paging message is received and the first PUR occasion.

In one embodiment, the first uplink message comprises a first RRC message and/or the first downlink message comprises a second RRC message.

Referring back to FIGS. 3 and 4, in one exemplary embodiment of a UE, the device 300 includes a program code 312 stored in the memory 310. The CPU 308 could execute program code 312 to enable the UE (i) to receive, from a network node, a paging message indicative of MT-EDT, (ii) to determine, in response to receiving the paging message, a validity of a timing parameter associated with one or more PURs, and (iii) to determine, based on the validity, whether to initiate a RA procedure for MT-EDT or to initiate a transmission using the one or more PURs. Furthermore, the CPU 308 can execute the program code 312 to perform one, some and/or all of the above-described actions and steps and/or others described herein.

Figure 19:
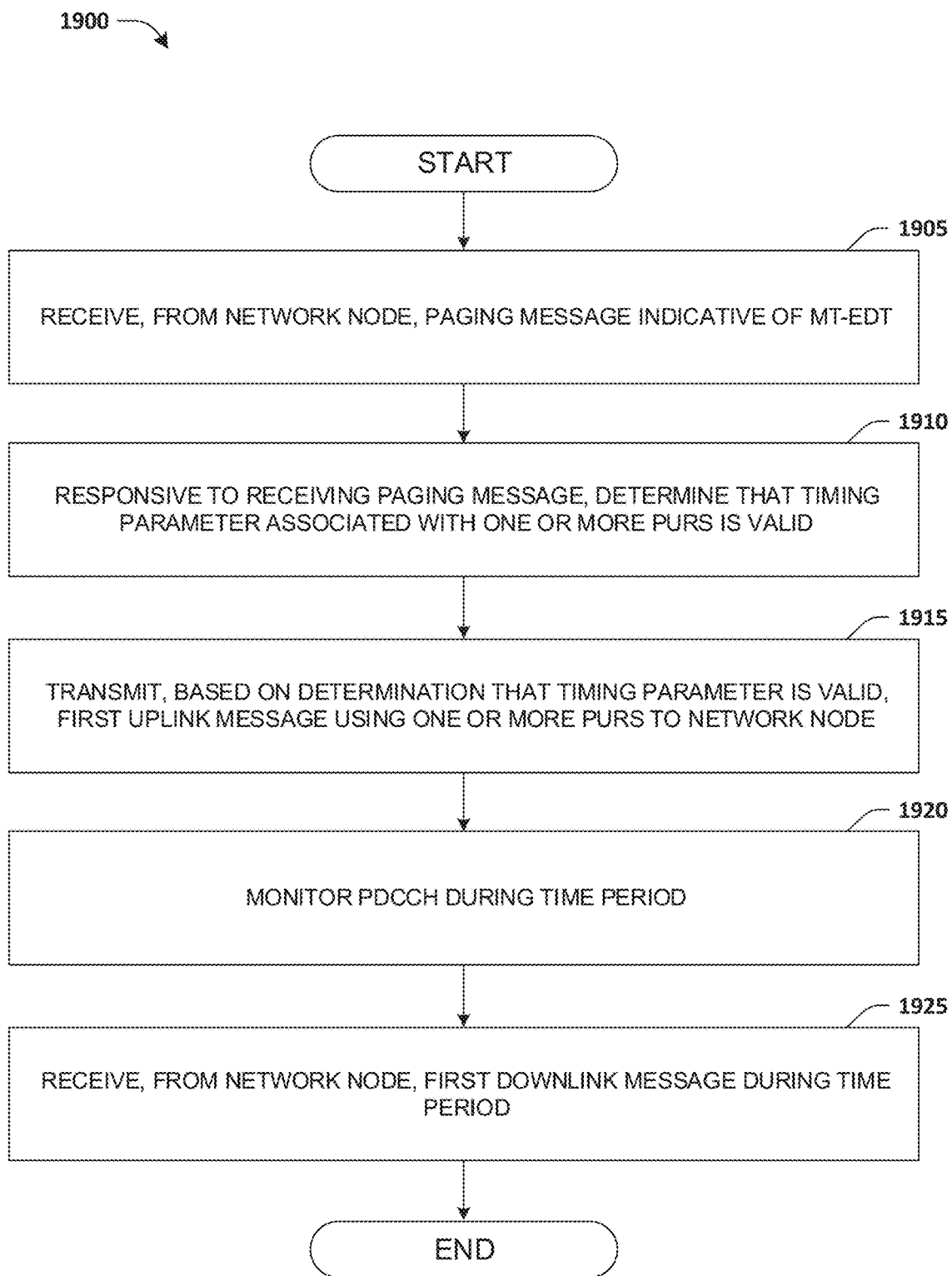
FIG. 19 is a flow chart according to one exemplary embodiment.

FIG. 19 is a flow chart 1900 according to one exemplary embodiment from the perspective of a UE. In step 1905, the UE receives, from a network node, a paging message indicative of MT-EDT. In step 1910, in response to receiving the paging message, the UE determines that a timing parameter associated with one or more PURs is valid. In step 1915, the UE transmits, based on the determination that the timing parameter is valid, a first uplink message using the one or more PURs to the network node. In step 1920, the UE monitors PDCCH during a time period. In step 1925, the UE receives, from the network node, a first downlink message during the time period. For example, the UE may receive the first downlink message via the PDCCH and/or the UE may receive the first downlink message while the UE monitors the PDCCH during the time period.

In one embodiment, in response to receiving the first downlink message, the UE transmits, to the network node, a second uplink message, wherein the second uplink message comprises uplink data responsive to downlink data comprised in the first downlink message. For example, the uplink data in the second uplink message may be a response to the downlink data in the first downlink message.

In one embodiment, prior to receiving the paging message, the UE receives, from the network node, a first PUR configuration associated with the one or more PURs.

In one embodiment, the timing parameter is a Timing Advance or a Timing Adjustment.

In one embodiment, the determination that the timing parameter is valid is performed based on validation criteria in the first PUR configuration. The validation criteria may be associated with the timing parameter. For example, the validation criteria may be Timing Advance validation criteria. Alternatively and/or additionally, the validation criteria may be Timing Adjustment validation criteria.

In one embodiment, the validation criteria comprises a timer associated with the one or more PURs. For example, the timer may be a Timing Advance timer. Alternatively and/or additionally, the timer may be a Timing Adjustment timer. Alternatively and/or additionally, the timer may be a Time Alignment timer.

In one embodiment, the determination that the timing parameter is valid is based on a determination that the timer is running.

In one embodiment, the PDCCH is monitored based on the first PUR configuration.

In one embodiment, the time period is a PUR search space window and/or a time length of the time period is configured in the first PUR configuration.

In one embodiment, the transmission of the first uplink message is performed on a first PUR occasion and/or the first PUR occasion is a next available PUR occasion when the paging message is received. For example, there may be no other PUR occasion associated with the UE between a time that the paging message is received and the first PUR occasion.

In one embodiment, the first uplink message comprises a first RRC message and/or the first downlink message comprises a second RRC message.

Referring back to FIGS. 3 and 4, in one exemplary embodiment of a UE, the device 300 includes a program code 312 stored in the memory 310. The CPU 308 could execute program code 312 to enable the UE (i) to receive, from a network node, a paging message indicative of MT-EDT, (ii) to determine, in response to receiving the paging message, that a timing parameter associated with one or more PURs is valid, (iii) to transmit, based on the determination that the timing parameter is valid, a first uplink message using the one or more PURs to the network node, (iv) to monitor PDCCH during a time period, and (v) to receive, from the network node, a first downlink message during the time period. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform one, some and/or all method steps illustrated in FIGS. 18-19. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 18-19, and/or one, some and/or all of the above-described actions and steps and/or others described herein.

It may be appreciated that applying one or more of the techniques presented herein may result in one or more benefits including, but not limited to, improving efficiency and/or reducing power consumption, signaling overhead and/or scheduling delay in scenarios in which a UE configured with one or more PURs (e.g., one or more dedicated PURs) receives a paging message indicative of MT-EDT, as a result of at least one of determining whether to initiate a RA procedure or to initiate a PUR transmission based on whether a timing parameter is valid, determining to initiate the PUR transmission rather than the RA procedure based upon a determination that the timing parameter is valid, as a result of not releasing a PUR configuration if a RA procedure for MT-EDT is initiated, such that a network may not need to provide a PUR configuration again, etc.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
  receiving, from a network node, a paging message indicative of Mobile-terminated Early Data Transmission (MT-EDT);
  responsive to receiving the paging message, determining a validity of a timing parameter associated with one or more Preconfigured Uplink Resources (PUR);
  determining, based on the validity, whether to initiate a Random Access (RA) procedure for MT-EDT or to initiate a transmission using the one or more PURs; and
  at least one of:
    initiating the RA procedure for MT-EDT based on a determination that the timing parameter is not valid; or
    transmitting, based on a determination that the timing parameter is valid, a first uplink message using the one or more PURs to the network node.

2. The method of claim 1, further comprising:
  after initiating the RA procedure for MT-EDT based on the determination that the timing parameter is not valid, transmitting the first uplink message to the network node during the RA procedure for MT-EDT.

3. The method of claim 1, further comprising:
  after transmitting the first uplink message using the one or more PURs to the network node, monitoring Physical Downlink Control Channel (PDCCH) during a time period; and
  receiving, from the network node, a first downlink message during the time period.

4. The method of claim 3, further comprising:
  responsive to receiving the first downlink message, transmitting, to the network node, a second uplink message, wherein the second uplink message comprises uplink data responsive to downlink data comprised in the first downlink message.

5. The method of claim 1, further comprising:
  prior to receiving the paging message, receiving, from the network node, a first PUR configuration associated with the one or more PURs.

6. The method of claim 5, wherein:
  the timing parameter is a Timing Advance or a Timing Adjustment;
  the determining the validity of the timing parameter is performed based on validation criteria included in the first PUR configuration; and
  the validation criteria is associated with the timing parameter.

7. The method of claim 6, wherein:
  the validation criteria comprises a timer associated with the one or more PURs; and
  the determining the validity of the timing parameter comprises:
    determining that the timing parameter is valid based on a determination that the timer is running; or
    determining that the timing parameter is not valid based on a determination that the timer is not running.

8. The method of claim 3, further comprising:
  prior to receiving the paging message, receiving, from the network node, a first PUR configuration associated with the one or more PURs, wherein:
    the monitoring the PDCCH is performed based on the first PUR configuration;
    the time period is a PUR search space window; and
    a time length of the time period is configured in the first PUR configuration.

9. The method of claim 3, wherein:
the transmitting the first uplink message is performed on a first PUR occasion; and
the first PUR occasion is a next available PUR occasion when the paging message is received.

10. The method of claim 3, wherein:
the first uplink message comprises a first Radio Resource Control (RRC) message; and
the first downlink message comprises a second RRC message.

11. A communication device, comprising:
a processor; and
memory comprising processor-executable instructions that when executed by the processor cause performance of operations, the operations comprising:
receiving, from a network node, a paging message indicative of Mobile-terminated Early Data Transmission (MT-EDT);
responsive to receiving the paging message, determining a validity of a timing parameter associated with one or more Preconfigured Uplink Resources (PUR);
determining, based on the validity, whether to initiate a Random Access (RA) procedure for MT-EDT or to initiate a transmission using the one or more PURs;
at least one of:
initiating the RA procedure for MT-EDT based on a determination that the timing parameter is not valid; or
transmitting, based on a determination that the timing parameter is valid, a first uplink message using the one or more PURs to the network node.

12. The communication device of claim 11, the operations further comprising:
after initiating the RA procedure for MT-EDT based on the determination that the timing parameter is not valid, transmitting the first uplink message to the network node during the RA procedure for MT-EDT.

13. The communication device of claim 11, the operations further comprising:
after transmitting the first uplink message using the one or more PURs to the network node, monitoring Physical Downlink Control Channel (PDCCH) during a time period; and
receiving, from the network node, a first downlink message during the time period.

14. The communication device of claim 13, the operations further comprising:
responsive to receiving the first downlink message, transmitting, to the network node, a second uplink message, wherein the second uplink message comprises uplink data responsive to downlink data comprised in the first downlink message.

15. The communication device of claim 11, the operations further comprising:
prior to receiving the paging message, receiving, from the network node, a first PUR configuration associated with the one or more PURs.

16. The communication device of claim 15, wherein:
the timing parameter is a Timing Advance or a Timing Adjustment;
the determining the validity of the timing parameter is performed based on validation criteria included in the first PUR configuration; and
the validation criteria is associated with the timing parameter.

17. The communication device of claim 16, wherein:
the validation criteria comprises a timer associated with the one or more PURs; and
the determining the validity of the timing parameter comprises:
determining that the timing parameter is valid based on a determination that the timer is running; or
determining that the timing parameter is not valid based on a determination that the timer is not running.

18. The communication device of claim 13, the operations further comprising:
prior to receiving the paging message, receiving, from the network node, a first PUR configuration associated with the one or more PURs, wherein:
the monitoring the PDCCH is performed based on the first PUR configuration;
the time period is a PUR search space window; and
a time length of the time period is configured in the first PUR configuration.

19. The communication device of claim 13, wherein:
the transmitting the first uplink message is performed on a first PUR occasion; and
the first PUR occasion is a next available PUR occasion when the paging message is received.

20. The communication device of claim 13, wherein:
the first uplink message comprises a first Radio Resource Control (RRC) message; and
the first downlink message comprises a second RRC message.

21. A method of a User Equipment (UE), the method comprising:
receiving, from a network node, a paging message indicative of Mobile-terminated Early Data Transmission (MT-EDT);
responsive to receiving the paging message, determining a validity of a timing parameter associated with one or more Preconfigured Uplink Resources (PUR) associated with a timer,
wherein the determining the validity of the timing parameter comprises:
determining that the timing parameter is valid based on a determination that the timer is running; or
determining that the timing parameter is not valid based on a determination that the timer is not running; and
determining, based on the validity, whether to initiate a Random Access (RA) procedure for MT-EDT or to initiate a transmission using the one or more PURs.

22. A method of a User Equipment (UE), the method comprising:
receiving, from a network node, a first PUR configuration associated with one or more Preconfigured Uplink Resources (PURs);
receiving, from the network node, a paging message indicative of Mobile-terminated Early Data Transmission (MT-EDT);
responsive to receiving the paging message, determining a validity of a timing parameter associated with the one or more PURS;
determining, based on the validity, whether to initiate a Random Access (RA) procedure for MT-EDT or to initiate a transmission using the one or more PURs; and
monitoring a Physical Downlink Control Channel (PDCCH), based on the first PUR configuration, during a time period.

* * * * *